United States Patent [19]

Tamura

[11] Patent Number: 5,278,657
[45] Date of Patent: Jan. 11, 1994

[54] CAMERA APPARATUS SELECTIVELY OPERABLE AS A FULLY ELECTRONIC SLIT CAMERA

[75] Inventor: Eiji Tamura, Kanagawa, Japan
[73] Assignee: Sony Corporation, Tokyo, Japan
[21] Appl. No.: 889,123
[22] Filed: May 27, 1992

[30] Foreign Application Priority Data

| May 31, 1991 | [JP] | Japan | 3-129601 |
| May 31, 1991 | [JP] | Japan | 3-129977 |
| Jun. 7, 1991 | [JP] | Japan | 3-136597 |
| Apr. 9, 1992 | [JP] | Japan | 4-089050 |

[51] Int. Cl.$^5$ .............................................. H04N 5/30
[52] U.S. Cl. ............................... 358/209; 358/213.11
[58] Field of Search .............. 358/209, 213.11, 335, 358/310, 337, 339, 206, 207, 208, 199; 360/9.1, 35.1, 33.1; 354/109; H04N 5/30, 5/225

[56] References Cited

U.S. PATENT DOCUMENTS

| 3,890,463 | 6/1975 | Ikegami et al. | 178/6.8 |
| 4,296,438 | 10/1981 | Stemme et al. | 358/214 |
| 4,769,552 | 9/1988 | Boue et al. | 250/578 |
| 4,797,751 | 1/1989 | Yamaguchi | 358/335 |
| 5,136,283 | 8/1992 | Nobs | 340/799 |

FOREIGN PATENT DOCUMENTS

| 0236157 | 9/1987 | European Pat. Off. | H04N 5/335 |
| 0369585 | 5/1990 | European Pat. Off. | H04N 7/18 |
| 4-97667 | 3/1992 | Japan | H04N 5/335 |
| 2122338 | 1/1984 | United Kingdom | G01N 21/47 |

Primary Examiner—Michael T. Razavi
Assistant Examiner—Tuan V. Ho
Attorney, Agent, or Firm—William S. Frommer; Alvin Sinderbrand

[57] ABSTRACT

When signal charges stored in a vertical transfer shift register (8V) of a CCD (8), for example, are shifted to a horizontal transfer shift register (8H), signal charges of a predetermined line are shifted at low speed and signal charges of other lines are shifted at high speed. Thus, a camera having an area sensor formed of a solid state imager element (CCD) or the like can pick up an image in the form of a standard television signal and also can serve as an entirely electronic slit camera.

10 Claims, 23 Drawing Sheets

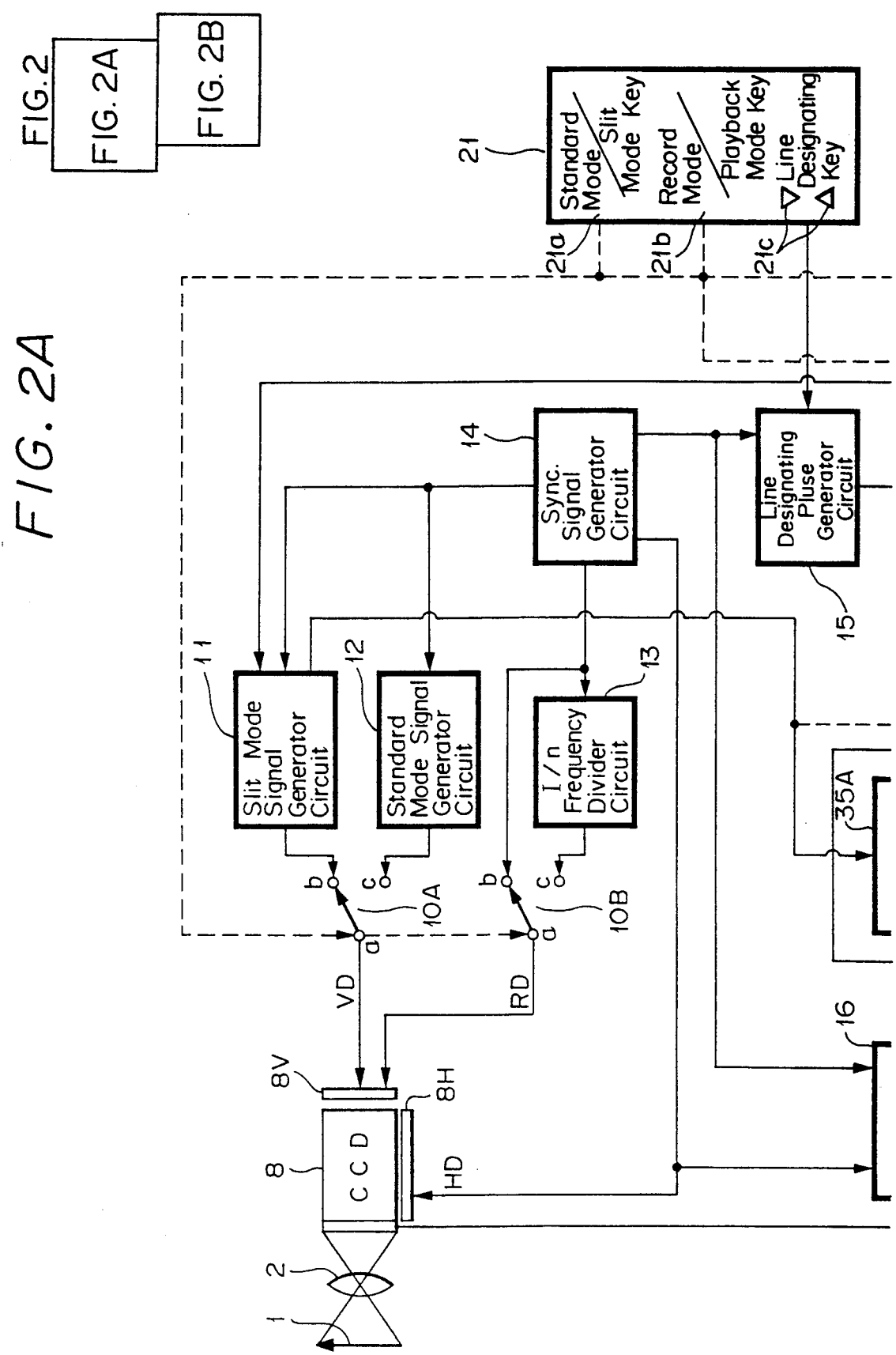

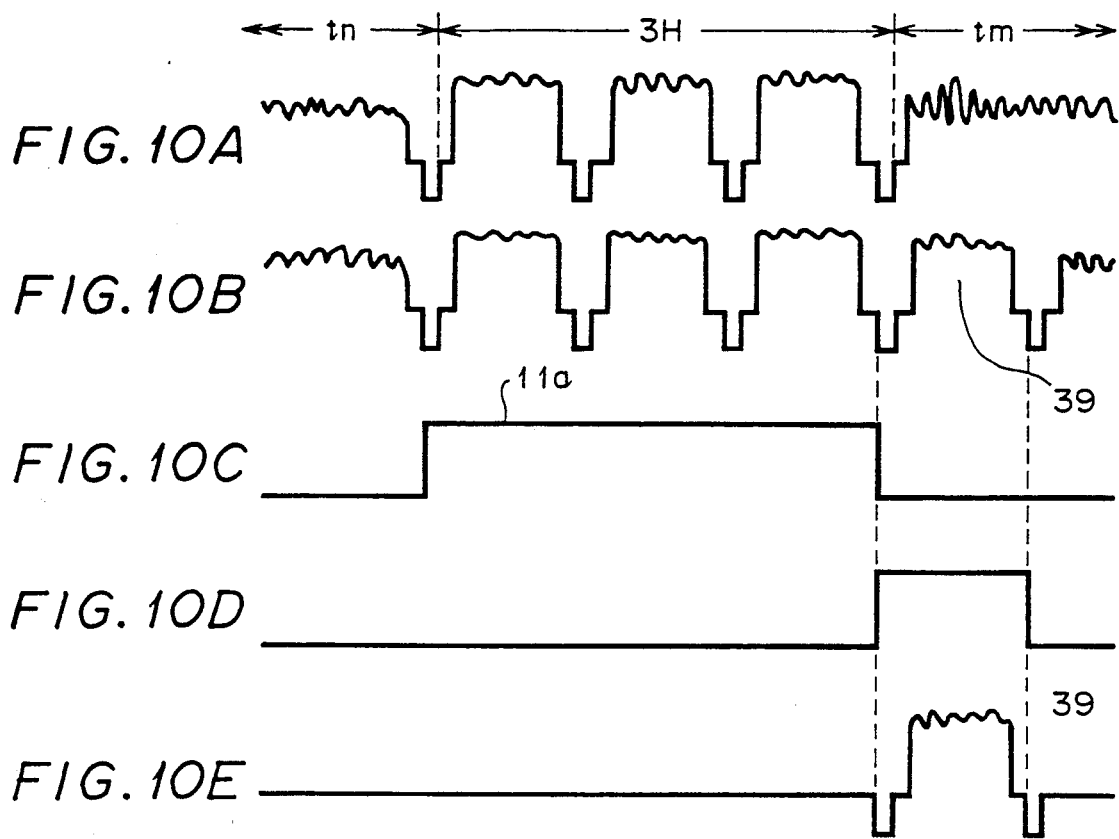
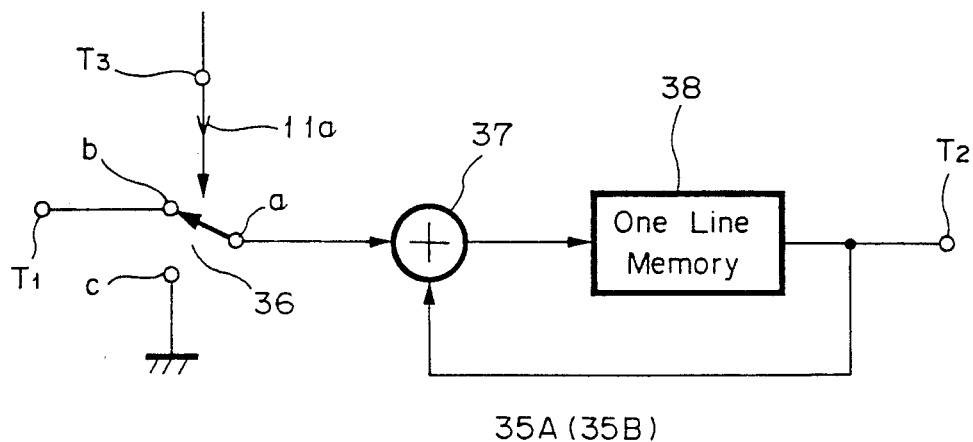
FIG. 11

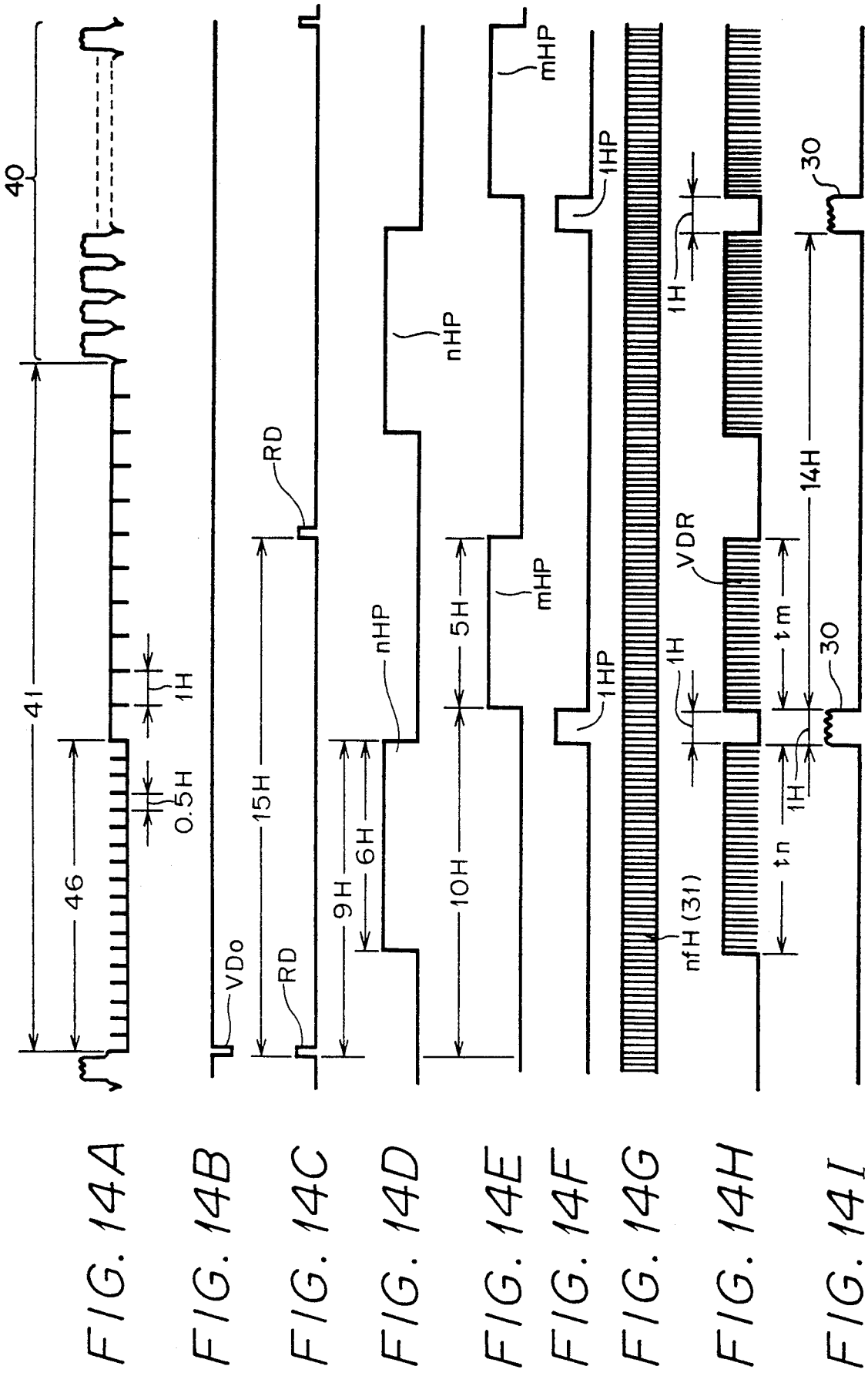

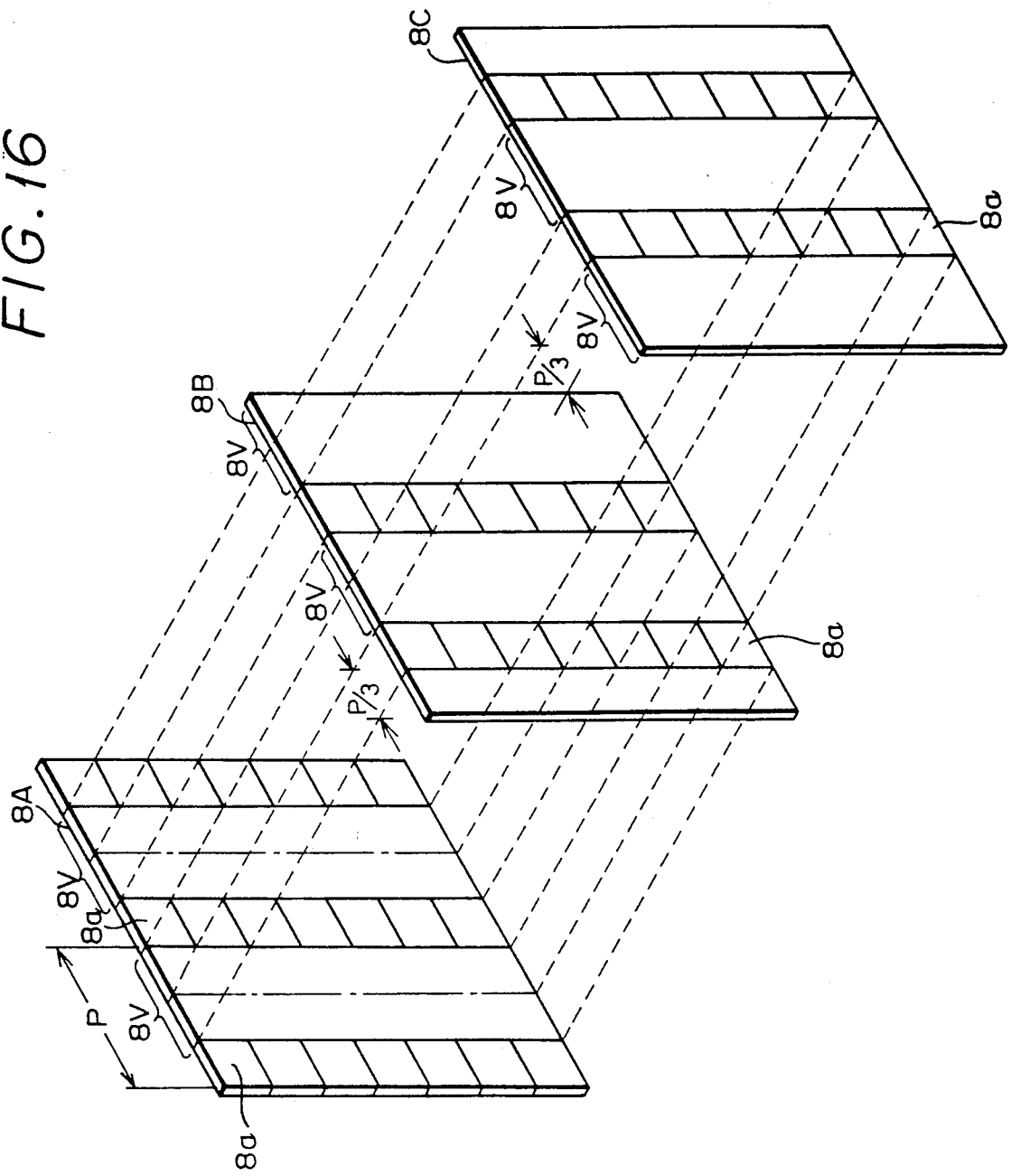

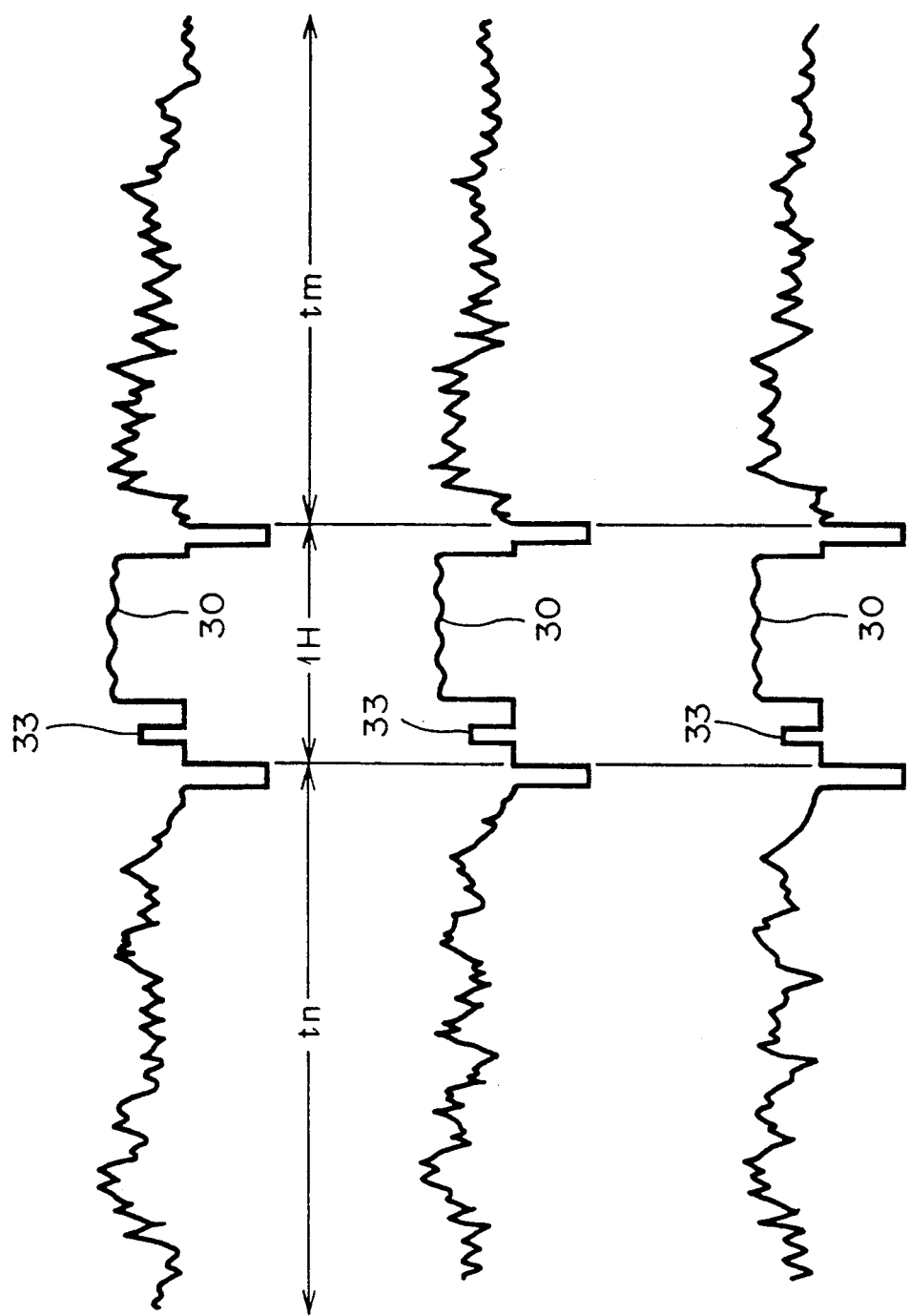

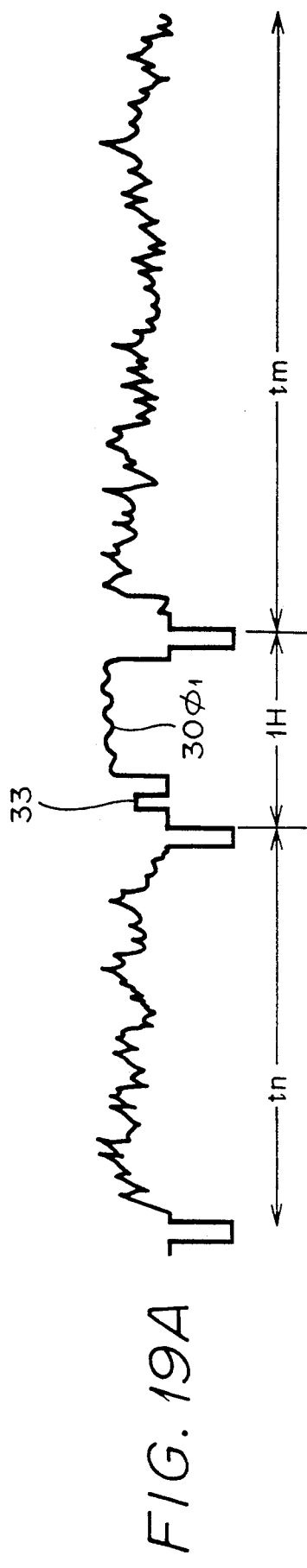
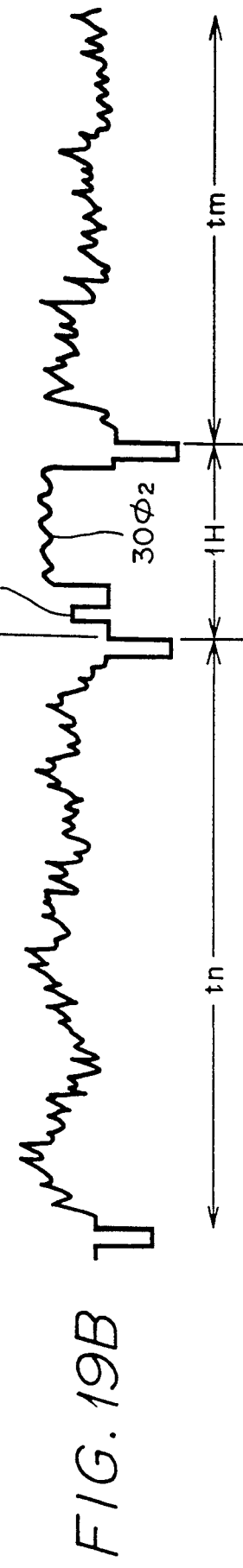
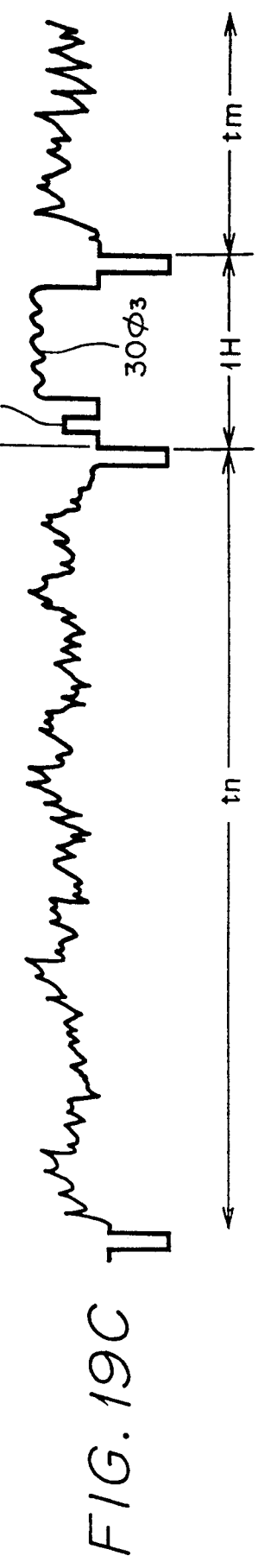
FIG. 19A
FIG. 19B
FIG. 19C

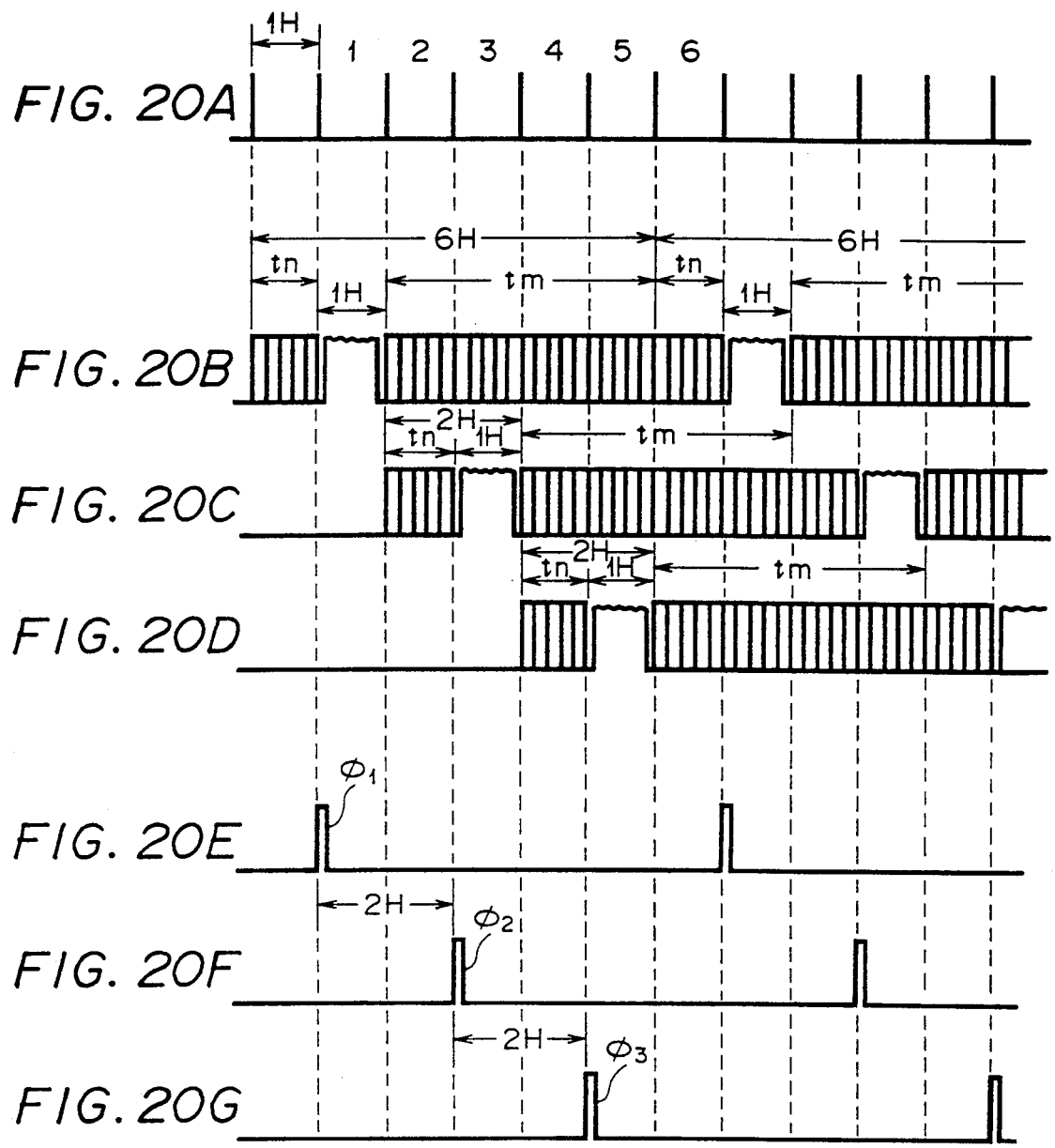

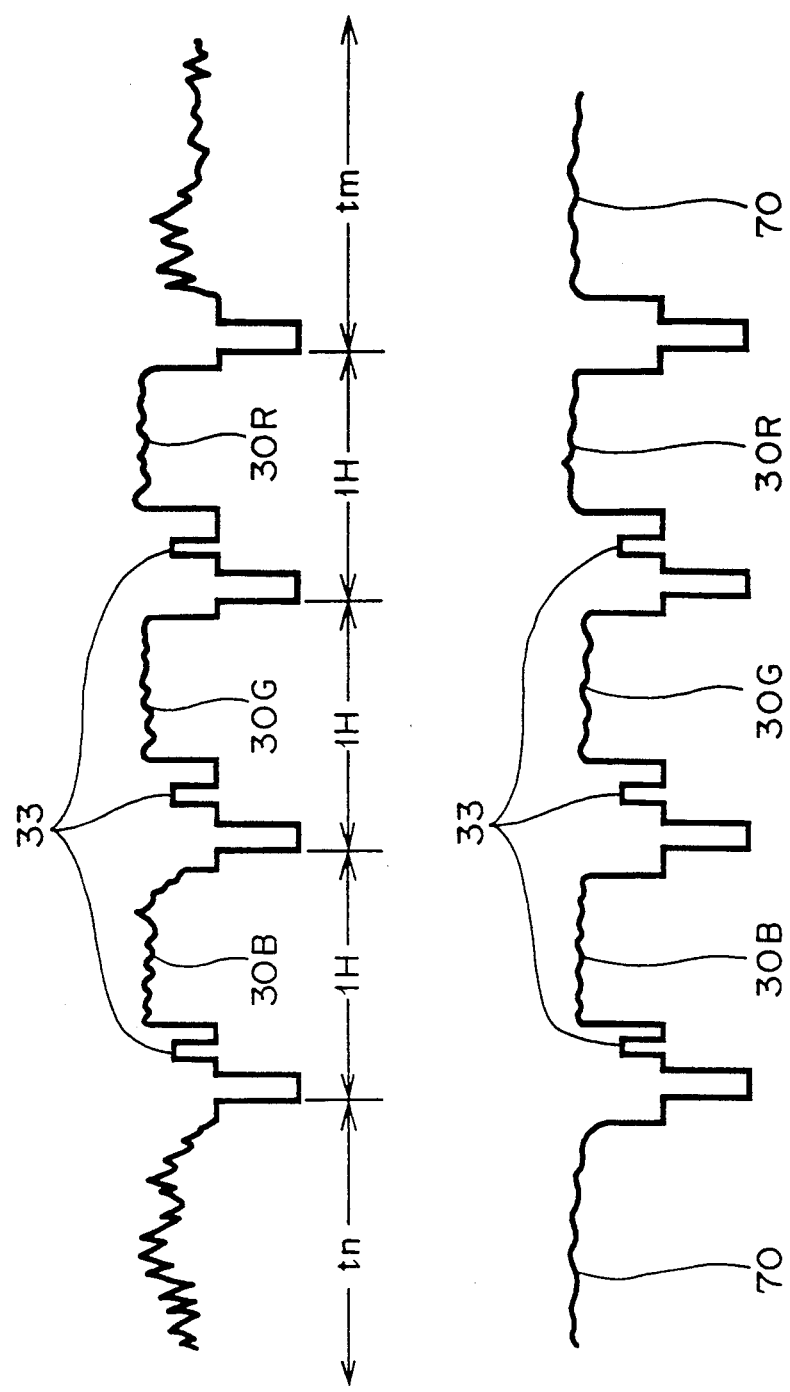

CAMERA APPARATUS SELECTIVELY OPERABLE AS A FULLY ELECTRONIC SLIT CAMERA

BACKGROUND OF THE INVENTION

1. Field of the Invention

The present invention generally relates to camera apparatus such as a slit camera or the like and, more particularly, to a camera apparatus suitable for taking a picture of an object which is moving at high speed.

2. Description of the Prior Art

Slit cameras are widely used to decide the result of the race of objects which are moving at high speed. Because standard system television cameras cannot take a picture of an object which is moving at high speed, the slit camera is designed to capture an image of an object in a line fashion. FIG. 1A shows a simplified arrangement of the conventional slit camera.

Referring to FIG. IA, an object 1 is moving at high speed in the direction shown by an arrow D. An object image is picked up on a line sensor 3 through a relay lens 2 and a video signal V is generated from the line sensor 3 in response to a picked-up image 4 on the line sensor 3.

FIG. 1B shows another example of a conventional slit camera in which a slit image is focused on an area sensor 8.

As shown in FIG. 1B, a picked-up image of an object 1 which is moving at high speed in the direction shown by an arrow D becomes incident on each plane of a polygon mirror 7 through a relay lens 2 and a slit 6 formed on the slit plate 5. The polygon mirror 7 is rotated in the counter-clockwise direction shown by an arrow in FIG. 1B so that images reflected on the respective planes of the polygon mirror 7 from the slit 6 are sequentially projected onto the area sensor 8 as projected images 4, 4, 4 . . . Then, these projected images 4, 4, 4, . . . are output as the video signal V.

According to the prior-art slit camera shown in FIG. 1A, the camera apparatus must be formed by special sensors such as a line sensor or the like and the area sensor 8 such as a solid state image pickup device (hereinafter simply referred to as a CCD (charge-coupled device)) or the like utilized in ordinary cameras cannot be utilized as the image pickup means.

Even though the conventional slit camera using the polygon mirror as shown in FIG. IB can use the area sensor 8, such slit camera needs a mechanical rotating mechanism such as the slit plate 5 and the polygon mirror 7.

Further, the area sensor using only one CCD or the like cannot provide sufficient resolution.

Furthermore, if a color camera apparatus uses the slit plate 5 and the polygon mirror 7, then a mechanical rotating mechanism is needed, which causes deterioration in a color band characteristic as a result.

OBJECTS AND SUMMARY OF THE INVENTION

Accordingly, it is an object of the present invention to provide an improved slit camera in which the aforesaid shortcomings and disadvantages encountered with the prior art can be eliminated.

More specifically, it is an object of the present invention to provide an entirely electronic slit camera which uses an area sensor such as a CCD and which can serve also as an ordinary camera.

Another object of the present invention is to provide a slit camera of high sensitivity which can be used also as an ordinary camera.

Still another object of the present invention is to provide a slit camera which can serve also as a camera driven according to the standard television system.

A further object of the present invention is to provide a slit camera of high sensitivity and high resolution which can serve also as an ordinary camera.

Yet a further object of the present invention is to provide a slit camera which is satisfactory in resolution in the time axis direction.

Still a further object of the present invention is to provide a color slit camera which can serve also as an ordinary color camera.

According to the invention, a camera for generating an image of an object moving at high speed includes a twodimensional array of image elements for forming lines of image charge signals, a plurality of liens of charge storage registers extending in a line direction and arrayed in association with the array of image elements for storing the image charge signals formed by the array of image elements and for shifting the stored image charge signals line-by-line in a column direction that is perpendicular to the line direction, a line output register that is adjacent in the column direction to the lines of charge storage registers for receiving the shifted image charge signals line-by-line and for shifting a received line of the image charge signals element-by-element to an output terminal, means for selecting at least one line of wanted image charge signals from among the image charge signals stored in the lines of charge storage registers, and means for driving the lines of charge storage registers so that the image charge signals stored therein are shifted toward the line output register at a first rate at a time when the at least one line of wanted image charge signals is being shifted into the line output register and so that the image charge signals stored in the charge storage registers are shifted toward the line output register at a second rate that is substantially faster than the first rate at times when lines of the image charge signals other than the at least one line are being shifted into the line output register.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 10A through 10E are respectively waveform diagrams used to explain a line adder circuit used in the camera apparatus according to the present invention;

FIG. 11 is a block diagram showing a circuit configuration of the line adder circuit used in the camera apparatus according to the present invention;

FIGS. 14A through 14I are respectively waveform diagrams used to explain operation of the slit mode signal generator circuit shown in FIG. 13;

FIG. 16 is a perspective view illustrating an arrangement of a three-chip CCD used in the camera apparatus according to the present invention; FIGS. 17A through 17C are respectively waveform diagrams used to explain an adding method used in the camera apparatus according to the present invention;

FIGS. 19A through 19C are respectively waveform diagrams showing an example of an output from the camera apparatus shown in FIG. 18; FIGS. 20A through 20G are respectively waveform diagrams showing another example of an output from the camera apparatus according to the present invention;

FIGS. 22A and 22B are respectively waveform diagrams used to explain how to insert a line sequential signal and an index signal in the slit mode in the camera apparatus according to the present invention;

DETAILED DESCRIPTION OF THE PREFERRED EMBODIMENTS

A slit camera using single CCD according to a first embodiment of the present invention will now be described with reference to FIGS. 2 to 8.

Figure 2B:
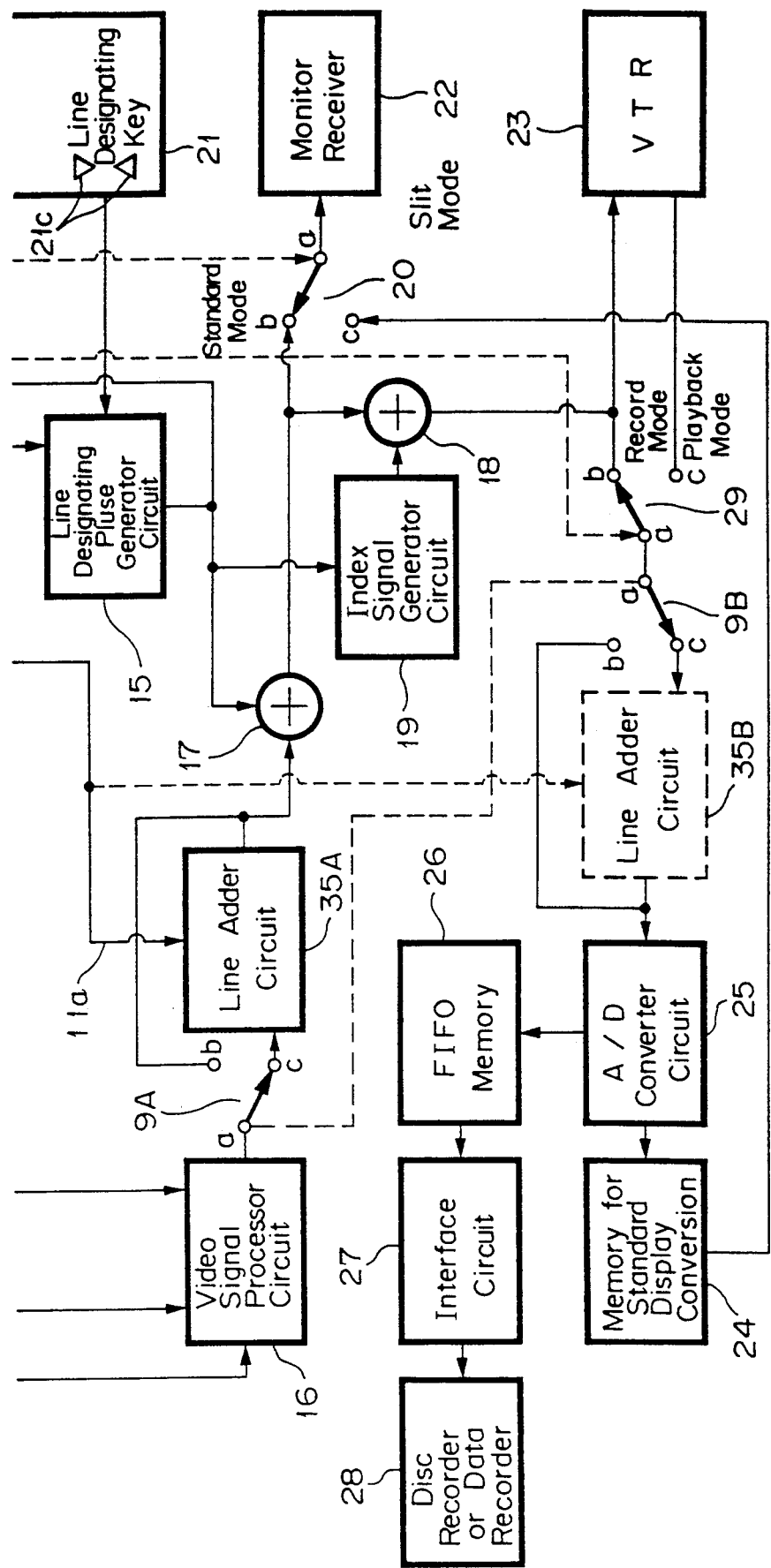
FIG. 2, which is formed of FIGS. 2A and 2B drawn on two sheets of drawings so as to permit the use of a suitably large scale, is a block diagram showing a camera apparatus according a first embodiment of the present invention.

FIG. 2 of the accompanying drawings shows in block form the entire arrangement of the slit camera according to the first embodiment of the present invention. In this case, FIG. 2 is formed of FIGS. 2A and 2B drawn on two sheets of drawings so as to permit the use of a suitably large scale.

Referring to FIG. 2, an imager device 8 is a CCD of an interline type and composed of pixel groups formed of a sensor unit, a vertical transfer shift register 8V and a horizontal transfer shift register 8H.

When a high speed moving object 1 is picked up by the CCD 8, then an object image projected through a relay lens 2 onto the pixel group of the CCD 8 is converted into an electrical signal. This electrical signal is supplied through a video processor circuit 16, a switch 9A, a line adder circuit 35A, a first adder circuit 17, a switch 20 to a monitor receiver 22 formed of display means such as a cathode ray tube (CRT), a liquid crystal display (LCD) device or the like and thereby an image is displayed on the monitor 22. The above switch 20 is used to selectively switch between the standard mode in which a picture is taken according to the normal television system (hereinafter this mode is referred to as "standard mode") and an image pickup mode in which a picture is taken by a slit camera (hereinafter this mode is referred to as "slit mode").

Further, a video signal output from the first adder circuit 17 is supplied through a second adder circuit 18, which will be described later, to a video tape recorder (VTR) 23 and a disc recorder or data recorder 28 and thereby recorded.

A horizontal drive pulse (hereinafter referred to as "HD") or the like is supplied to the horizontal transfer shift register 8H of the CCD 8 and the video signal processor circuit 16 from a synchronizing (sync.) signal generator circuit 14.

An operation unit 21 includes control means such as a computer or the like. A slit mode key and a standard mode key 21a are selected on the basis of an instruction signal from the control means and hence a vertical pulse (hereinafter referred to as "VD) and a read-out pulse (hereinafter referred to as "RD") are supplied through switches 10A and 10B to the vertical transfer shift register 8V of the CCD 8.

More specifically, various vertical reference signals from the sync. signal generator circuit 14 are supplied to a standard mode signal generator circuit 12, a slit mode signal generator circuit 11, the video signal processor circuit 16, a fixed contact b of the switch 10B and a line designating pulse generating circuit 15, respectively.

A line designating pulse signal from the line designating pulse generating circuit 15 is supplied to the slit mode signal generator circuit 11 and this line designating pulse is also supplied to the first adder circuit 17 and an index signal generator circuit 19.

Output ends of the slit mode signal generator circuit 11 and the standard mode signal generator circuit 12 are coupled to fixed contacts b and c of the switch 10a, and a movable contact a of the switch 10a is coupled to the vertical transfer shift register 8V of the CCD 8 to supply the vertical pulse VD to the vertical transfer shift register 8V. An output end of a frequency-dividing circuit 13 is coupled to the fixed contact c of the switch 10B to thereby supply the read-out pulse RD to the vertical transfer shift register 8V.

The operation unit 21 includes an operation key 21a for switching the CCD 8 between the standard mode and the slit mode, a record/playback key 21b for recording the signals of the respective modes on and/or reproducing the same from the video tape recorder 23, the disc recorder or data recorder 28 and a line designating key 21c for designating the line position and the line number of the slit mode. When these keys are operated, then as shown by broken lines in FIG. 2, the slit mode and standard mode change-over switches 10A, 10B, the switch 20 for causing the slit mode or the standard mode to be monitored, a switch 29 for changing-over the recording and reproducing states of the video tape recorder 23 and the switches 9A and 9B for operating the line adder circuits 35A, 35 are respectively controlled. Also, the line designating pulse generator circuit 15 is driven by the operation of the line designating key 21c.

The second adder circuit 18 adds an index signal from the index generator circuit 19 to a signal representative of a line-designated predetermined position, and supplies the added signal to the video tape recorder 23, and through the fixed contact b and movable contact a of the recording and reproducing change-over switch 29 and the switch 9B for switching the added signal 35B to an analog-to-digital (A/D) converter circuit 25 either directly or through a line adder circuit 35B. The added signal is converted into a digital signal by the A/D converter circuit 25. Data converted in the form of the digital signal is supplied to a standard display conversion memory 24 and a first-in first-out (FIFO) memory 26. An output of the FIFO memory 26 is supplied through an interface circuit 27 to the recording apparatus 28 such as the disc recorder, the data recorder or the like which is different from the video tape recorder 23.

The slit mode video signal stored in the standard display conversion memory 24 is read out therefrom as the standard mode video signal and then fed through the fixed contact c of the switch 20 to the monitor receiver 22, whereafter it is displayed on the display means.

Operation of the slit mode signal generator circuit 11 and the standard mode signal generator circuit 12 will be described below with reference to FIG. 3, 4A through 4D, 5 and 6A through 6D.

Figure 3:
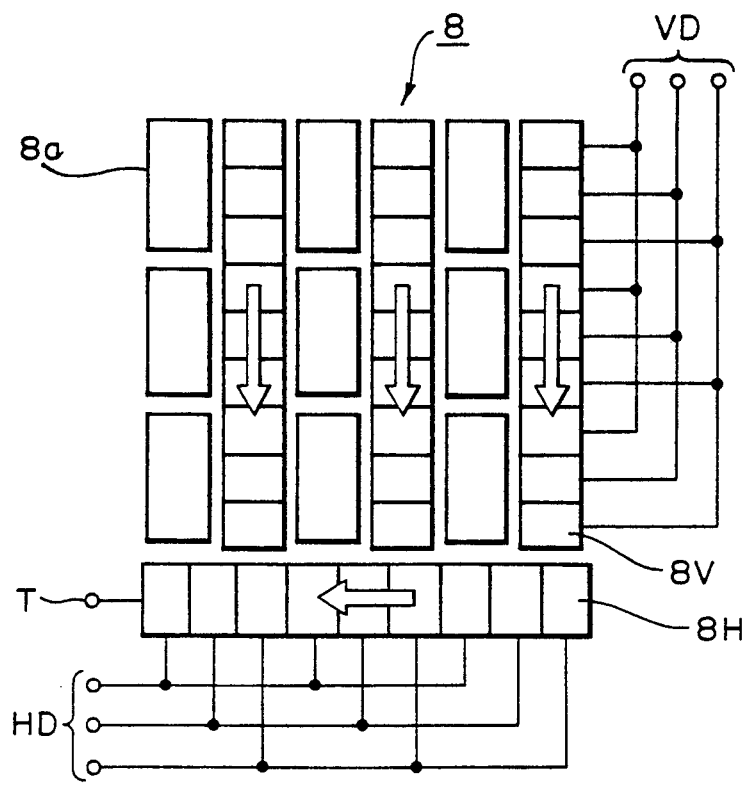
FIG. 3 is a plan view of a standard mode CCD used in the camera apparatus according to the present invention.

With reference to FIG. 3 and FIGS. 4A through 4D, an operation in which the signal is supplied to the vertical transfer shift register 8V of the CCD 8 in the standard mode will be described together with waveforms. FIG. 3 schematically show pixel group 8a forming a sensor unit of the CCD 8 of the interline type, the vertical transfer shift register 8V, the horizontal transfer shift register 8H and the drive signal VD and HD supplied to the vertical and horizontal transfer shift registers 8V and 8H.

In the interline type CCD 8, pixel group 8a extending in the vertical direction (Y-axis direction) and the vertical transfer shift register 8V making up the storage section are alternately arrayed in the horizontal direction (X-axis direction). Signal charge photo-electrically converted in the pixel group 8a are momentarily transferred to the vertical transfer shift register 8V during one portion of the vertical blanking period and hence the pixel group 8a is set again in the state for storing light. Signal charges stored in the vertical transfer shift register 8V are transferred to the horizontal transfer shift register 8H line by line in response to the drive signal VD during one portion of the horizontal blanking period, so that a signal charge for one horizontal line being sequentially developed at an output terminal T.

Figure 4A:
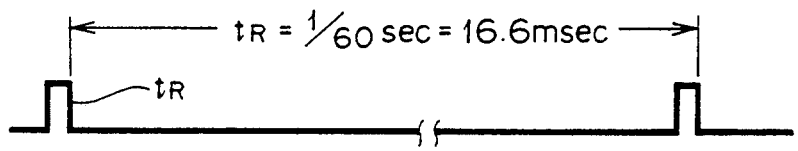
FIGS. 4A through 4D are respectively waveform diagrams used to explain the standard mode CCD shown in FIG. 3.
Figure 4B:
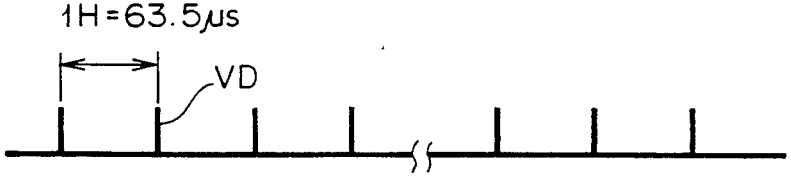
Figure 4C:
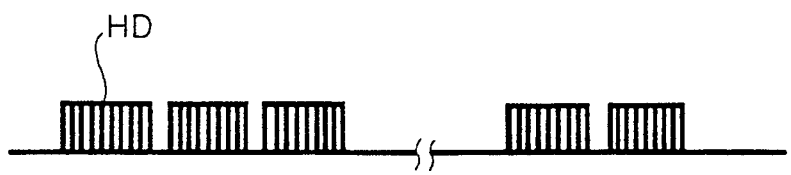
Figure 4D:
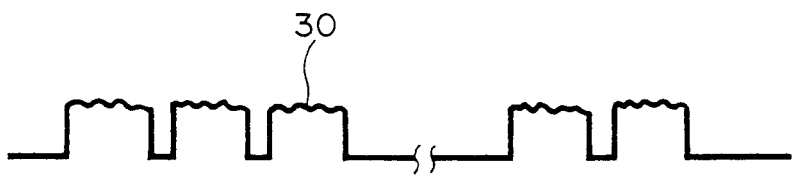

That is, when a pulse $T_R$ is supplied from the sync. signal generator circuit 14 to the standard mode signal generator circuit 12 during a period of $t_R = 1/60 = 16.67$ ms which corresponds to the odd field or even field period as shown in FIG. 4A, the drive signal VD whose cycle corresponds to one horizontal period (1H = 63.5 $\mu$s) as shown in FIG. 4B is supplied from the standard mode signal generator circuit 12 to the vertical transfer shift register 8V and a drive signal HD shown in FIG. 4C is supplied to the horizontal transfer shift register 8H from the sync. signal generator circuit 14, whereby a video signal 30 shown in FIG. 4D is output from the CCD 8 to the video signal processor circuit 16. In this case, as the read-out pulse RD, there is supplied a signal which results from dividing the signal by n in the frequency-dividing circuit 13.

As a result, the read-out speed in the standard mode is determined by the maximum transfer rate of the vertical transfer shift register 8V.

Figure 5:
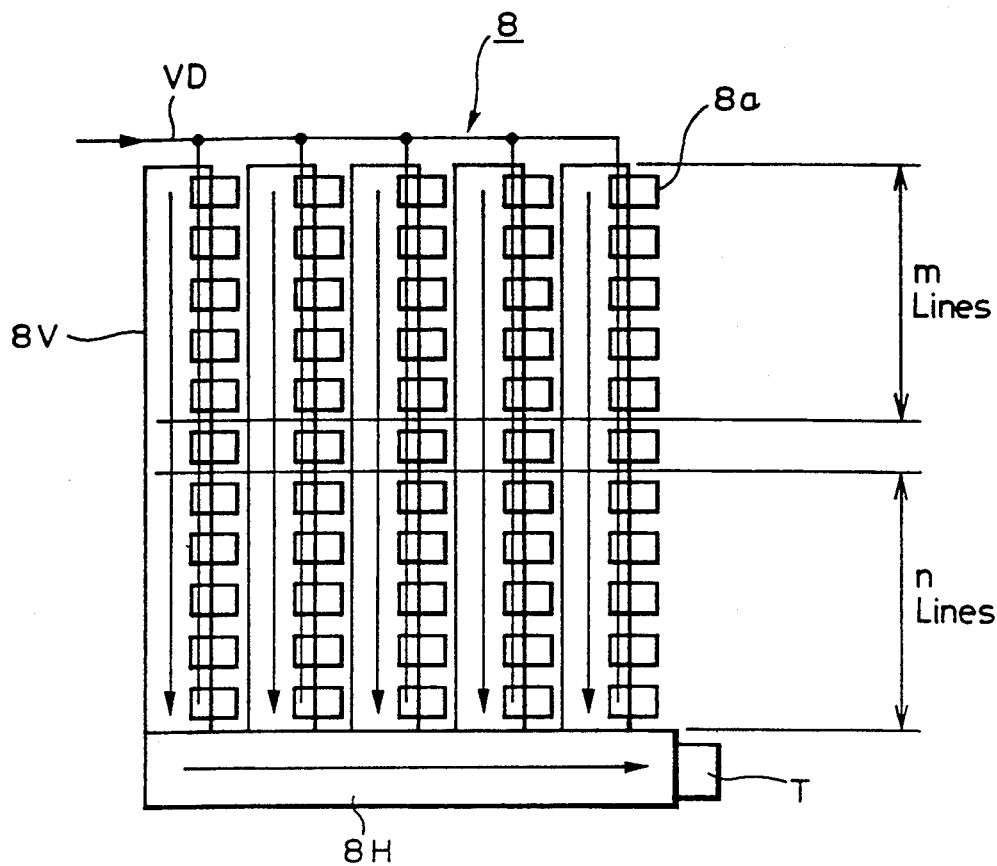
FIG. 5 is a plan view of a slit mode CCD used in the camera apparatus according to the present invention.
Figure 6A:
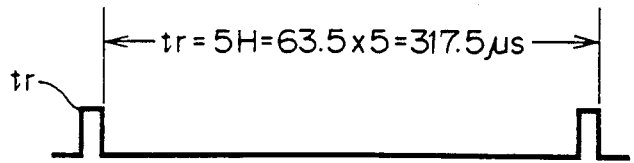
FIGS. 6A through 6D are respectively waveform diagrams used to explain the slit mode CCD shown in FIG. 5.

Then, a pulse tr whose cycle is presented as $tr = 5H = 63.5 \mu s \times 5 = 317.5 \mu s$ as shown in FIG. 6A is supplied to the slit mode signal generator circuit 11 from the sync. signal generator circuit 14. Then, after charges in the pixel 8a are transferred to the vertical shift register 8V, as shown in FIGS. 5 and 6C, signal charges are shifted at high speed during 2H (n lines), for example. When the signal charges during a target slit mode period, e.g., 1H period are transferred to the horizontal shift register 8H, then the operation of the vertical shift register 8V is stopped during the 1H period and the same low speed shift as that in the standard mode is effected. Thereafter, signal charges are shifted at high speed during the 2H (m line) period in order to discharge unnecessary signal charges form lines of the vertical transfer shift register 8V.

Figure 6B:
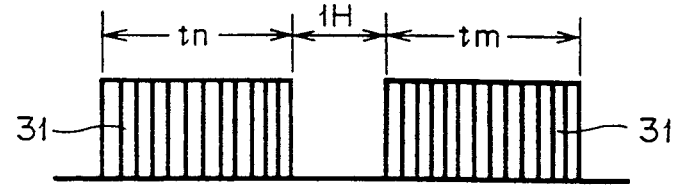
Figure 6C:
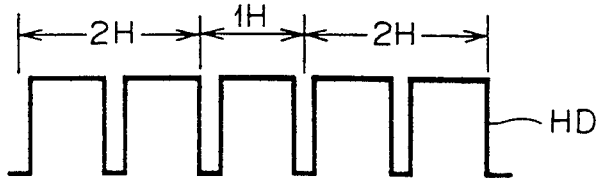
Figure 6D:
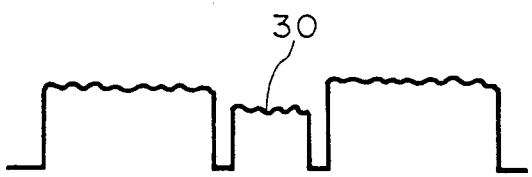

That is, signal charges are shifted at high speed during periods tn and tm shown in FIG. 6B and shifted at low speed during the slit mode period of 1H, whereby the signal output 30 shown in FIG. 6D is developed at the output terminal T. Thus, the output signal corresponding to 1H becomes a video output in the slit mode. The read-out pulse RD in the high speed shift operation might be a pulse which is not supplied through the switch 10B and the frequency-dividing circuit 13 but whose duration is sufficiently shorter than 1H cycle like a pulse 31 provided during the periods tn and tm shown in FIG. 6B.

The read-out cycle tr is 317.5 $\mu$s and can fall within 1 ms as compared with 16.6 ms of the conventional (standard mode) cycle.

Figure 7:
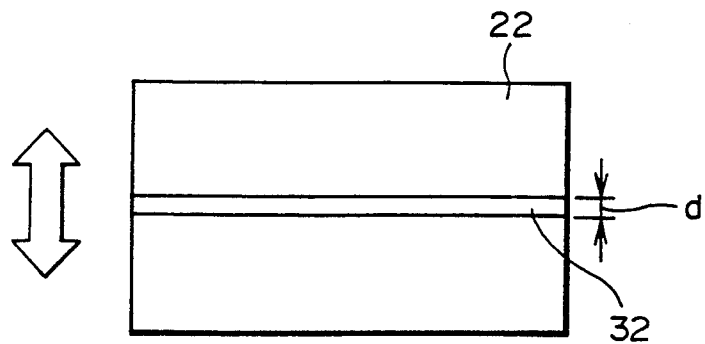
FIG. 7 is a schematic diagram showing an example of a picture displayed on a monitor used in the camera apparatus according to the present invention.

A method of designating lines in the slit mode will be described below. Initially, the operation key 21a of the operation unit 21 is set in the standard mode and a predetermined image is displayed on a display screen of the display means in the monitor receiver 22 as shown in FIG. 7. Then, by pressing the line designating operation key 21c in the upper and lower direction, a line marker 32 having a slit width d is superimposed on a predetermined position of the image displayed on the picture screen. At that time, a picture is taken in such a fashion that the scanning direction of the CCD 8 becomes perpendicular to the moving direction of the object 1.

More specifically, when the line designating key 21c of the operation unit 21 is depressed, then a line designating signal is supplied to the line designating pulse generating circuit 15 which then generates a line designating pulse on the basis of the horizontal sync. signal or the like from the sync. signal generator circuit 14. Then, the slit mode signal generator circuit 11 performs the high speed shift operation on the basis of the line designating pulse.

The line designating pulse supplied to the first adder circuit 17 is superimposed upon the video signal from the CCD 8. At that time, because the switch 20 is set in the standard mode wherein the movable contact a is connected to the fixed contact b, the line marker 32 shown in FIG. 7 is superimposed upon the display means of the monitor receiver 22, thereby designating the position of the slit line with ease.

The line designating pulse from the line designating pulse generator circuit 15 is supplied to the index generator circuit 19. This index generator circuit 19 may be composed of a write buffer memory, a frame memory or the like, though not shown. An index signal 33 supplied to the second adder circuit 18 is added onto the video signal as shown in FIG. 8.

Figure 8:
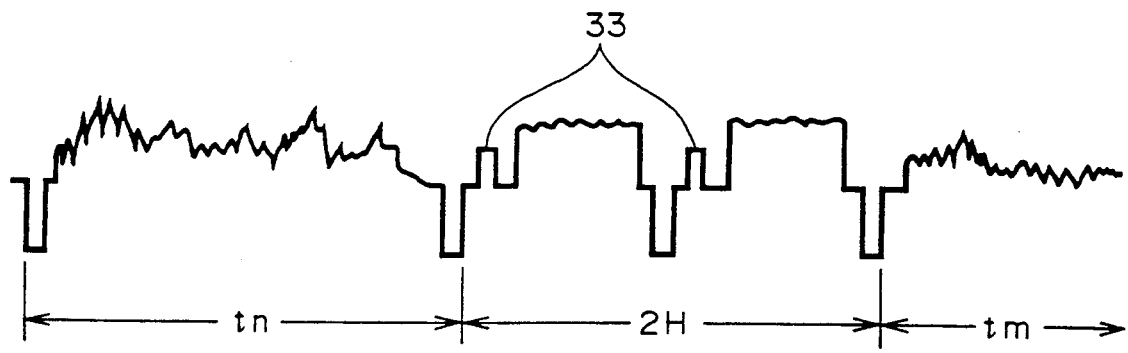
FIG. 8 is a waveform diagram used to explain insertion of an index signal in the camera apparatus according to the present invention.

FIG. 8 illustrates the case such that the slit width of the video signal on which the index signal 33 is superimposed in the low speed shift mode is selected to be 2 lines (2H). If the index signal 33 is superimposed as described above, then a starting portion of the video signal within the slit width recorded by the video tape recorder 23 can be detected very easily by reading the index signal 33.

Figure 1A:
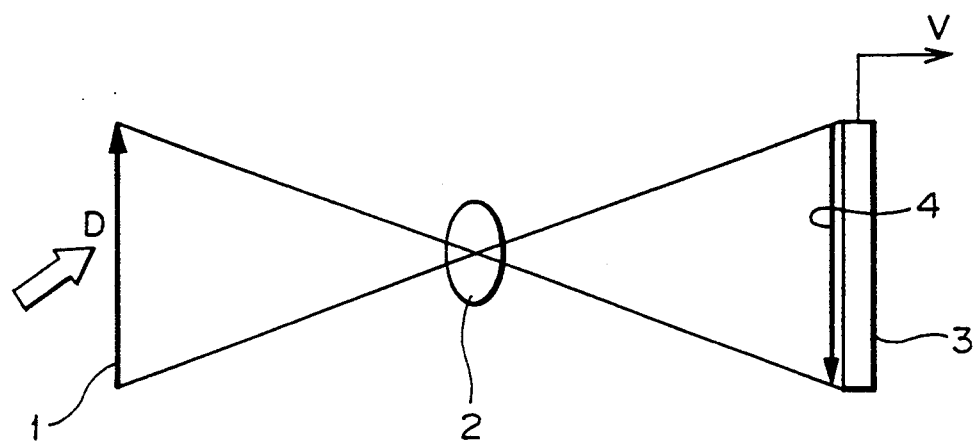
FIG. 1A is a schematic diagram showing an optical system of an example of a conventional slit camera.
Figure 1B:
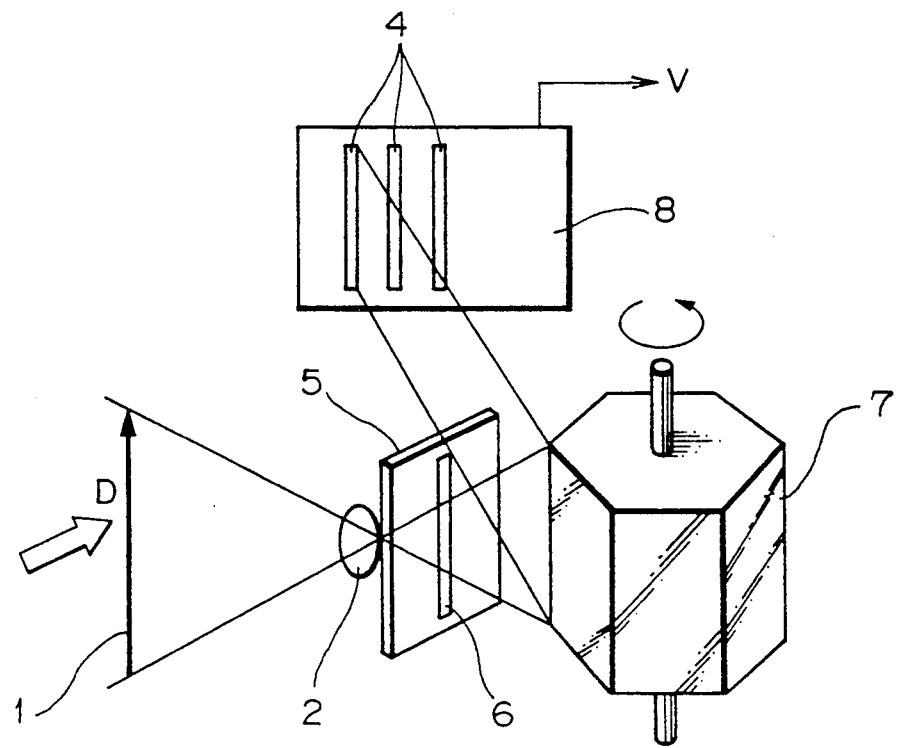
FIG. 1B is a schematic diagram showing an optical system of another example of a conventional slit camera.

While one predetermined line in the CCD is designated as described above, the present invention is not limited thereto and the following variation is also possible: If two line markers 32 and 32a are designated as shown in FIG. 9, then a speed V of the moving object 1 (see FIGS. 1A, 1B) or the like can be measured.

Figure 9:
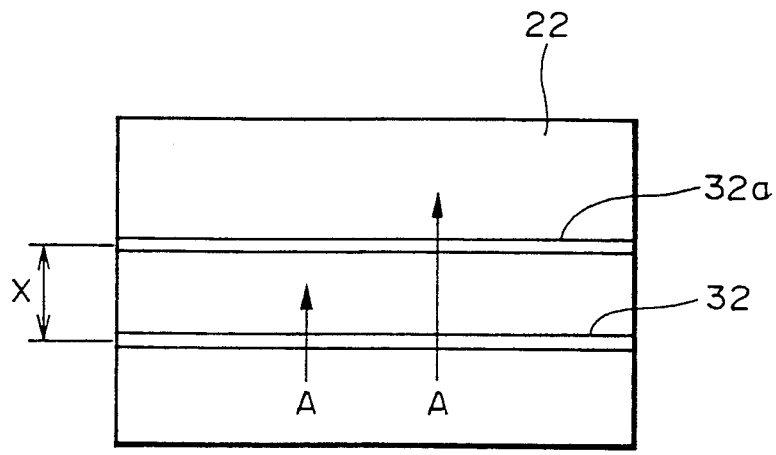
FIG. 9 is a schematic diagram showing an other example of the application of the present invention, and to which reference will be made in explaining the measurement of a speed of a moving object.

If a distance X between the line markers 32a and 32 thus designated in FIG. 9 is clear, then a speed of a moving object A can be calculated as $V = X/T$ by measuring a time T during which a signal of the moving object A appears at the position shown by the second line marker 32a after a signal of the moving object A appeared at the position shown by the first line marker 32.

While a CCD of the outerline type is employed as described above, the present invention is not limited thereto and the present invention can be similarly applied to CCD of the frame transfer and line transfer types.

While the low speed shift period in the slit mode is selected to be 1H and 2H as described above, the present invention is not limited thereto and the read-out width may be selected to be about 1H to 10H.

Waveform diagrams forming FIGS. 10A through 10E and a diagram forming FIG. 11 are used to explain operation of the arrangement in which several 1H periods in the slit mode are read out, added by the line adder circuit 35A or 35B and then recorded by the video tape recorder 23 to thereby increase a sensitivity of the picked-up output signal in the slit mode.

The line adder circuit 35A might be disposed by way of the movable contact a and the fixed contact c of the change-over switch 9A coupled to the succeeding stage of the video processor circuit 16 as shown in FIG. 2, for example. Alternatively, the line adder circuit 35A might be interposed between the switch 9B and the A/D converter circuit 25 as shown by dashed lines in FIG. 2. Incidentally, the fixed contacts b of the switches 9A and 9B are connected to the paths when the line adder circuit 35A or 35B is not to be operated.

When the line adder circuit 35A is disposed at the position shown by the solid line in FIG. 2, a sensitivity of the video signal in the slit mode can be increased and then this video signal with increased sensitivity can be recorded by the video tape recorder 23. Further, when the line adder circuit 35B is disposed at the position shown by the dashed lines in FIG. 2, after the signal is reproduced by the video tape recorder 23, the image signal in the slit mode supplied through a loop of the fixed contact c and the movable contact a of the switch 29, the movable contact a and the fixed contact c of the switch 9B, the line adder circuit 35B, the A/D converter circuit 25 and the standard display conversion memory 24, is displayed on the display means of the monitor receiver 22 by way of a loop of the fixed contact c and the movable contact a of the switch 20 and the monitor receiver 22. Therefore, the sensitivity of the video signal in the playback mode can be increased.

FIG. 11 of the accompanying drawings shows an example of a specific arrangement of the line adder circuit 35A or 35B.

As shown in FIG. 11, the video signal is input to an input terminal $T_1$ from the video signal processor 16 through the switch 9A, for example. This input video signal is supplied through the fixed contact b and the movable contact a of the switch 36 and the adder 37 to the one line memory 38. Then, a read-out output from the one line memory 38 is fed back to the adder 37 and then fed to an output terminal $T_2$. A fixed contact c of the switch 36 is grounded and a control signal 11a from the slit mode signal generator circuit 1 is supplied to an input terminal $T_3$. The movable contact a of the switch 36 is turned on and off by the control signal 11a from the slit mode signal generator circuit 11.

Operation of the above-mentioned line adder circuit 35A or 35B will be described with reference to waveform diagrams forming FIGS. 10A through 10E.

FIG. 10A shows a waveform provided when the low speed shift is effected in the slit mode during 3H periods. In FIG. 10A, tn and tm represent high speed shift periods similarly to FIG. 8.

The video signal from the video signal processor circuit 16 or the reproduced video signal from the video tape recorder 23 is input to the line adder circuit 35A or 35B and the signal of the high speed shift period is eliminated within the video signal processor circuit 16, while the signal of the low speed shift period is supplied through the movable contacts a and the fixed contacts c of the switches 9A and 9B to the line adder circuits 35A and 35B. Further, during the high speed shift periods tn and tm, the movable contact a of the switch 36 shown in FIG. 11 is coupled to the fixed contact c side and then grounded.

When the video signal of 3H periods in the slit mode as shown in FIG. 10A is applied, the movable contact a of the switch 36 is connected to the fixed contact b side in response to the gate control signal 11a shown in FIG.

10C during the 3H periods. Then, the 3H video signal is subjected to addition by an adder 37 and one line memory 38 in the line adder circuit 35A or 35B as shown in FIG. 10B and no signal is output at the output terminal $T_2$ during this period. An added video signal 39 provided after the addition of 3H periods is effected is gated by the gate waveform shown in FIG. 10D, whereby the video signal 39 (see FIG. 10E) in which the signal of 3H periods is added is developed at the output terminal $T_2$.

Since the predetermined line of the CCD is shifted at low speed and other lines are shifted at high speed as described above, particular lines are read out at high speed to effect the slit mode and hence an image of the high speed moving object 1 can be recorded on the video tape recorder 23 by the slit camera and also displayed on the monitor receiver 22. Therefore, the slit mode video signal having improved sensitivity as compared with that of the ordinary 1H slit mode video signal can be obtained.

However, if the predetermined high speed reading in the slit mode is carried out at the cycle of 5H as shown in FIG. 6C, for example, with a signal conforming to the format of the standard television system, e.g., the NTSC system, there is then the problem that the continuous reading during a period of 1H becomes impossible because an equalizing pulse or vertical sync. pulse of 0.5H occurs in the vertical blanking period.

Figure 12:
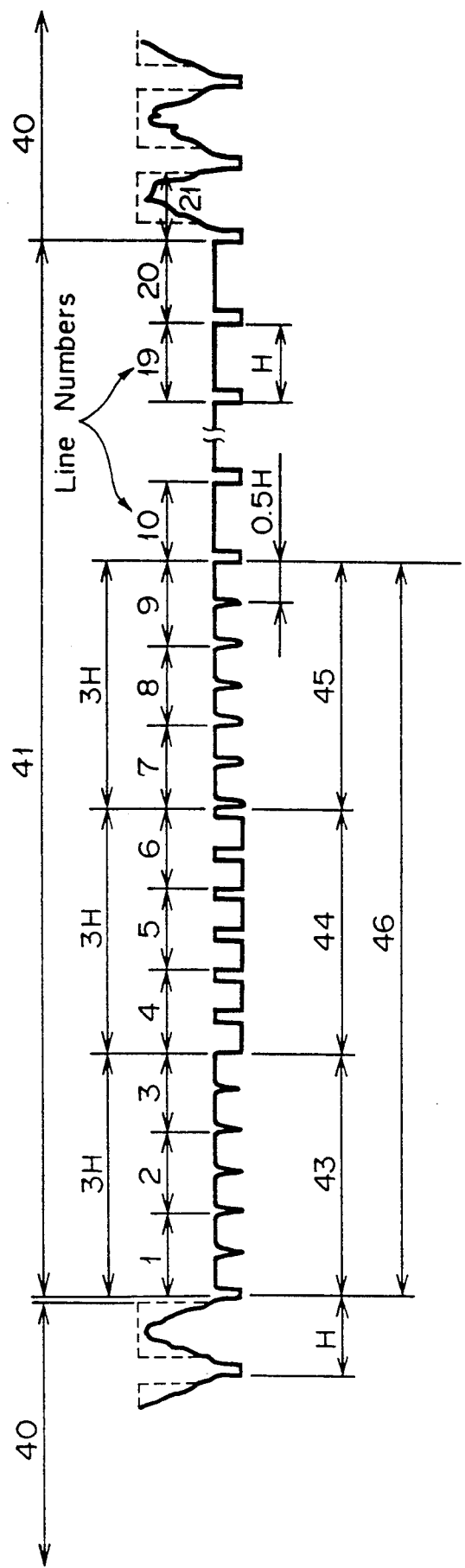
FIG. 12 is a waveform diagram of a vertical blanking period and to which reference will be made in explaining the camera apparatus according to the present invention.

FIG. 12 shows a waveform standard of the vertical blanking period according to the NTSC system which is known as one of the standard television system formats. In FIG. 12, reference numeral 40 depicts a video signal period and 41 a vertical blanking period of 20H. The vertical blanking period 41 includes a 9-line (H) period 46 composed of an equalizing pulse preceding period 43, a vertical sync. pulse 44 and an equalizing pulse succeeding period 45, each of which is formed of 3H in the units of 0.5H, whereafter the horizontal sync. pulse occurs at intervals of 1H during the line numbers 10 to 20.

Accordingly, if the reading cycle is selected so that the predetermined line is read out at high speed except for the 9-line period in FIG. 12, when the high speed moving object 1 is picked up by the slit camera conforming to the format of the standard television system such as the NTSC system or the like, then an accurate object image can be obtained.

An arrangement in which the 1H read-out cycle in the slit mode can be made continuous in synchronism with the horizontal sync. pulse according to the standard television system will be described below with reference to FIG. 13 and FIGS. 14A through 14I.

Figure 13:
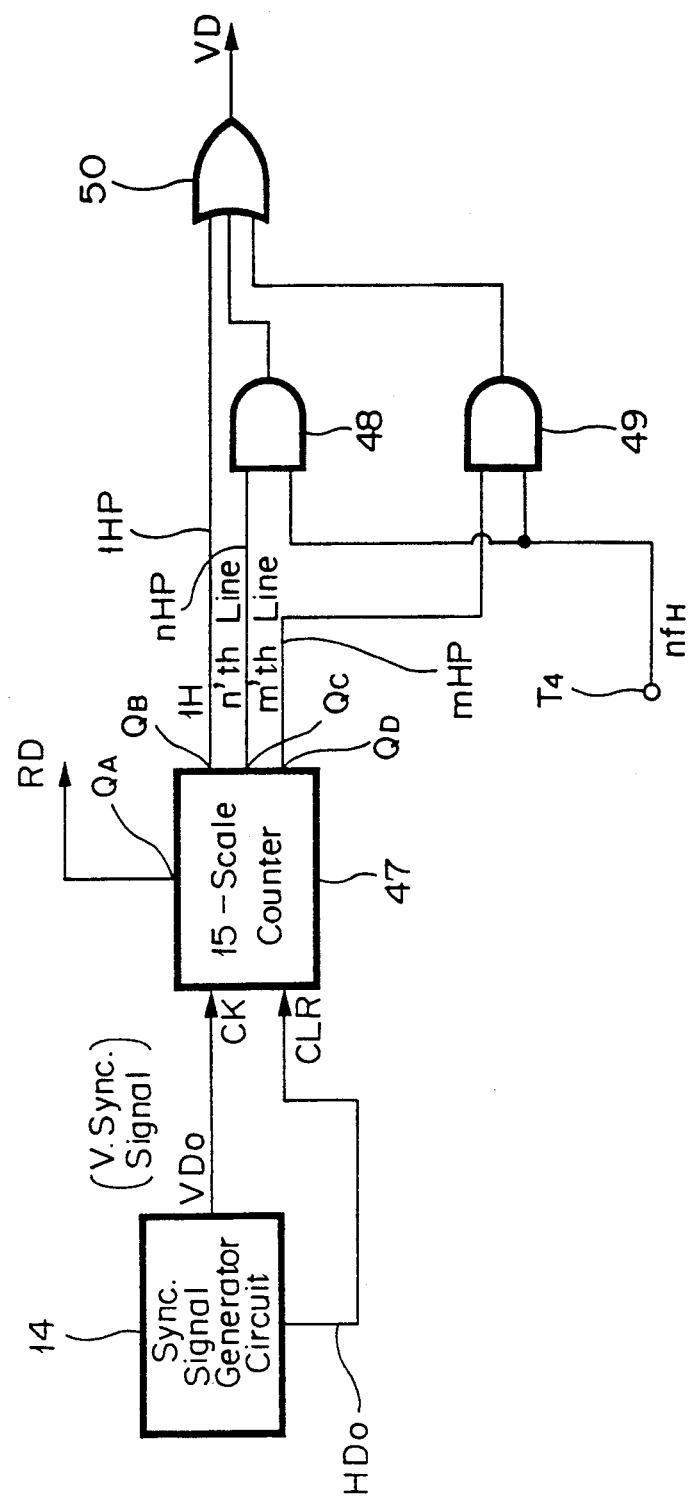
FIG. 13 is a block diagram showing a circuit configuration of a slit mode signal generator circuit used in the camera apparatus according to the present invention.

FIG. 13 shows an example of circuitry provided within the slit mode signal generator circuit 11 shown in FIG. 2 in order to achieve the above-mentioned purpose.

As shown in FIG. 13, synchronizing signals $VD_0$ and $HD_0$ from the sync. signal generator circuit 14 are respectively supplied to a count input terminal CK and a reset terminal CLR of a 15-scale counter 47.

The 15-scale counter 47 generates at terminals $Q_A$, $Q_B$, $Q_C$ and $Q_D$ a low speed 1 line (H) cycle pulse (hereinafter referred to as "1HP"), an n-line (H) high speed gate pulse (hereinafter referred to as "nHP"), and an m-line (H) high speed gate pulse (hereinafter referred to as "mHP"), respectively. The pulses nHP and mHP are supplied to respective input terminals of first and second AND gates 48 and 49, while a $nf_H$ pulse is supplied to the other input terminals of the first and second AND gates 48 and 49 from a terminal $T_4$. Outputs of the first and second gate circuits 48 and 49 and the pulse 1HP from the 15-scale counter 47 are supplied to an OR gate circuit 50. Then, the drive signal VD is output from the OR gate 50 and this drive signal VD is supplied through the fixed contact b and the movable contact a of the switch 10A to the vertical transfer shift register 8V of the CCD 8 (see FIG. 2).

Operation of this circuit configuration will be described with reference to waveform diagrams forming FIGS. 14A through 14I.

The reason that the 15-scale counter 47 is selected is as follows:

In the case of 525 scanning lines according to the standard NTSC television system, it is possible to take a 35-scale counter, a 25-scale counter, a 21-scale counter and a 15-scale counter which correspond to products such as products of integers $5 \times 5 = 25$, $7 \times 3 = 21$ and $5 \times 3 = 15$ which result from factoring 525 lines as in $525 = 5 \times 5 \times 3 \times 7$. Of these counters, the minimum 15-scale counter 47 is selected in this embodiment.

As described before, the high speed reading in the slit mode is inhibited from being carried out at the 0.5H cycle portion of the 9H period 46 in the vertical blanking period 41 shown in FIG. 14A.

The vertical sync. signal $VD_0$ from the sync. signal generator circuit 14 is supplied to the count input terminal CK of the 15-scale counter 47 as a pulse corresponding to the starting portion of the vertical blanking period 41 as shown in FIG. 14B. Simultaneously, the horizontal sync. signal $HD_0$ at 1H intervals is supplied to the reset terminal CLR of the 15-scale counter 47 so that, when supplied with the horizontal sync. signal $HD_0$ at 0.5H intervals, the 15-scale counter 47 is cleared.

At the same time when the vertical sync. signal $VD_0$ is input, the read-out pulse RD is output from the 15-scale counter 47 as shown in FIG. 14C (although the read-out pulse RD is output from the sync. signal generator circuit 14 in FIG. 2, the read-out pulse RD may be output from either the sync. signal generator 14 or the 15-scale counter 47). In this case, the high speed shift may be effected at the same time when the read-out pulse RD is output. As shown in FIG. 14D, during the 9H period 46, the pulse nHP of 6H after 3H has passed is output and then fed to the first AND gate circuit 48.

Similarly, as shown in FIG. 14E, after 10H has passed, the pulse mHP of 5H is output and then fed to the second AND gate circuit 49.

The first and second AND gate circuits 48 and 49 are supplied at the other input terminals with the pulse $nf_H$ shown in FIG. 14G from the terminal $T_4$. This pulse $nf_H$ corresponds to the aforementioned pulse 31 which is used to read-out the charges of the CCD at high speed during the period in which the pulses nHP and mHP are output.

Further, since the pulse 1HP shown in FIG. 14F is supplied from the 15-scale counter 47 to the OR gate circuit 50 and the outputs of the first and second AND gates 48, 49 also are supplied to the OR gate circuit 50, the OR gate circuit 50 outputs a pulse VDR shown in FIG. 14H and this pulse VDR is supplied to the vertical transfer shift register 8V of the CCD 8.

As a result, the read-out waveform supplied from the CCD 8 to the video signal processor circuit 16 becomes the video signal 30 which has a 15-H cycle as shown in FIG. 14I, whereby the video signal 30 can be prevented from being dropped into the 9H period 46 within the vertical blanking period 41. Thus, it is possible to obtain a slit camera which can pick up an image of a high speed moving object.

Figure 15A:
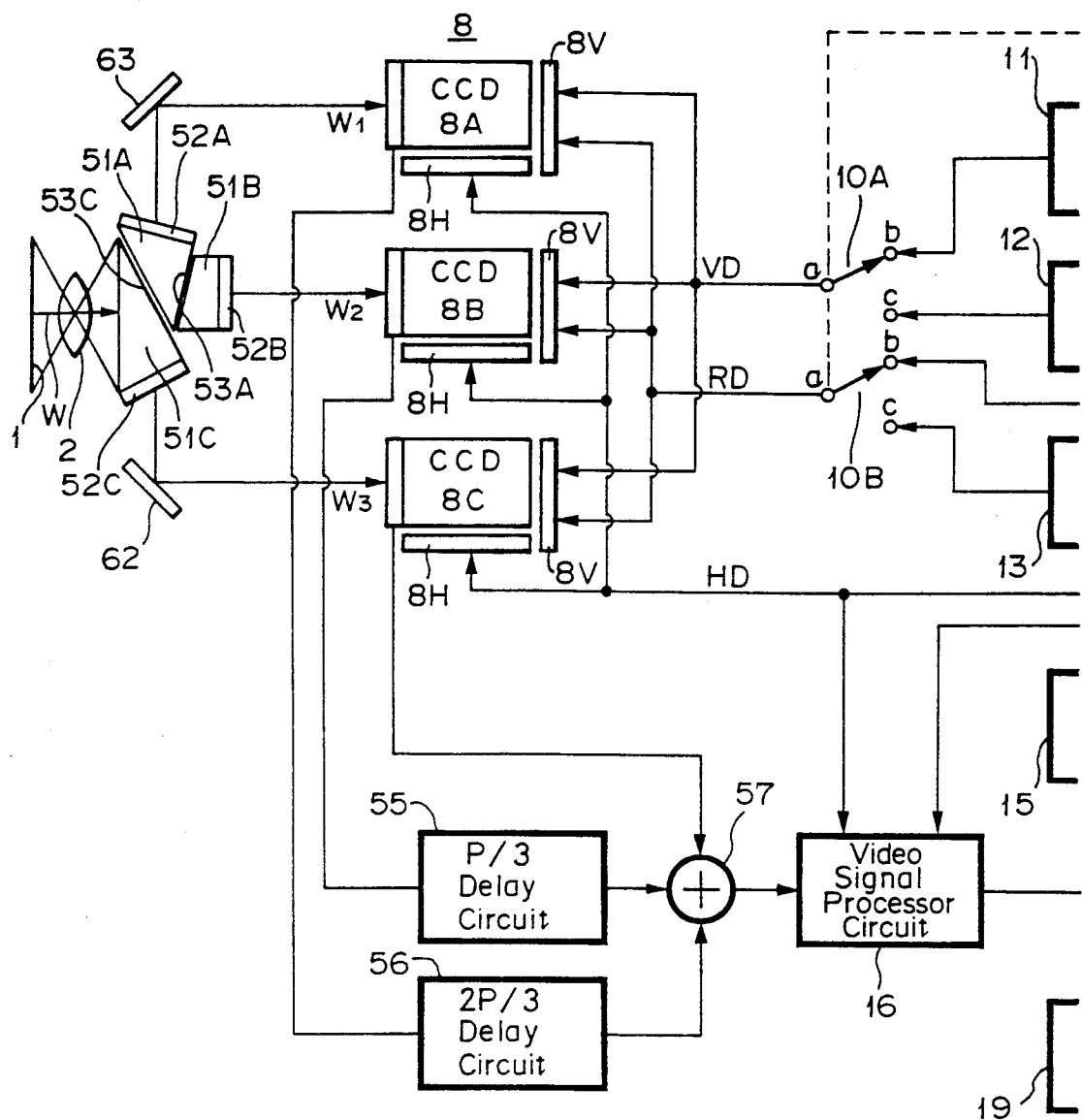
FIG. 15, which is formed of FIGS. 15A and drawn on two sheets of drawings so as to permit the use of a suitably large scale, is a block diagram showing a camera apparatus according to a second embodiment of the present invention.
Figure 15B:
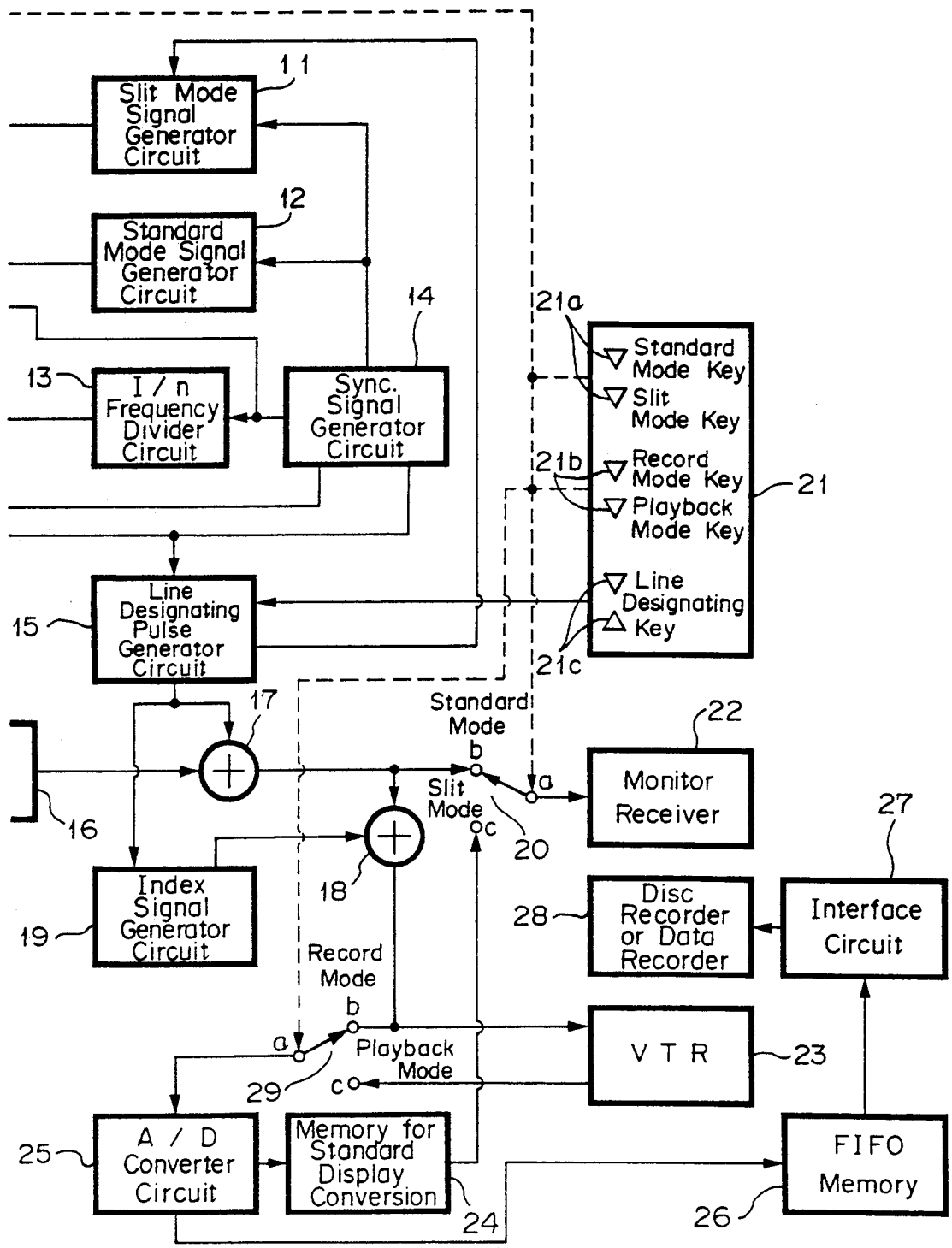

While the slit camera using the single CCD 8 is described in the above-mentioned embodiment, a slit camera using three CCDs can also be constructed as shown in FIG. 15. In this case, FIG. 15 is also formed of FIGS. 15A and 15B drawn on two sheets of drawings so as to permit the use of a suitably large scale. In FIG. 15, like parts corresponding to those of FIG. 2 are marked with the same references and therefore need not be described in detail.

FIG. 15 of the accompanying drawings shows in block form the entire arrangement of the slit camera which is applied to a black and white camera apparatus. In this embodiment, the imager device 8 is composed of the three CCDs of interline type, and each of the first, second and third CCDs 8A, 8B and 8C is composed of the pixel group formed of the sensor unit, the vertical transfer shift register 8V and the horizontal transfer shift register 8H.

Prisms 51A, 51B and 51C are disposed in front of the first second and third CCDs 8A, 8B and 8C to diverge the object image 1 into three directions. Each of these prisms 51A, 51B and 51C is formed of a beam splitter and incident light W from the object image 1 is introduced through the relay lens 2 into the prism 51C. Reflected light $W_3$ reflected on an end face 53C of the prism 51C travels through a light emitting face 52C and a mirror 62 to the photo-sensitive surface of the third CCD 8C.

The incident light W traveling through the end face 53C of the prism 51C is reflected on an end face 53A of the prism 51A, thereby being provided as reflected light $W_1$. This reflected light $W_1$ travels through an end face 52A and a mirror 63 to the photo-sensitive surface of the first CCD 8A.

The incident light W traveling through an end face 53A of the prism 51A is also travels through the prism 51B, thereby being provided as an incident light $W_2$. This incident light $W_2$ travels through an end face 51B of the prism 52 to the photo-sensitive surface of the second CCD 8B.

While the first, second and third CCDs 8A, 8B, 8C are disposed independently of the prisms 51A, 51B, 51C, in actual practice, the first CCD 8A is bonded to the light emitting face 52A of the prism 51A, the second CCD 8B is bonded to the light emitting face 52B of the prism 51B and the third CCD 8C is bonded to the light emitting face 52C of the prism 51C.

FIG. 16 schematically shows an example of how to bond the first, second and third CCDs 8A, 8B, 8C to the prisms 51A, 51B, 51C.

As shown in FIG. 16, the first, second and third CCDs 8A, 8B, 8C are bonded to the light emitting faces 52A, 52B, 52C with a displacement of p/3 between the vertical transfer shift registers 8B (spacing portion) based on a pitch P between adjacent pixels 8a in the horizontal direction.

Referring back to FIG. 15, when the high speed moving object 1 is picked up by the above-mentioned image pickup device 8, object images incident on groups of pixels 8a on the photo-sensitive surfaces of the first, second and third CCDs 8A, 8B, 8C are converted into three sets of video signals. An output from the CCD 8C is directly supplied to an adder circuit 57, an output from the CCD 8B is delayed by a delay amount of ⅓ pitch by a ⅓ pitch delay circuit 55 and then fed to the adder circuit 57, and an output from the CCD 8A is delayed by a delay amount of ⅔ pitch by a ⅔ pitch delay circuit 56 and then fed to the adder circuit 57.

The video signals from the first, second and third CCDs 8A, 8B, 8C are added by the adder circuit 57 and the added video signal is supplied through the video processor circuit 16, the adder circuit 17 and the switch 20, which switches between the standard mode for picking up an image according to the ordinary television system and the slit mode state for picking up an image by the slit camera, to the monitor receiver 22 formed of the display apparatus such as the CRT or LCD and so on, in which it is displayed as an image similarly to FIG. 2. This arrangement shows a path in which the video signal is displayed on the monitor receiver 22 by way of the movable contact a and the fixed contact b of the switch 9A as shown in FIG. 2.

Further, the video signal output from the adder circuit 17 is supplied through the adder circuit 18 to the video tape recorder 23 and other recording apparatus 28 such as the disc recorder, the data recorder or the like, thereby being recorded.

Operation of the slit mode signal generator circuit 11 and the standard mode signal generator circuit 12 according to the arrangement shown in FIG. 15 will be described below.

The first, second and third CCDs 8A, 8B, 8C are disposed such that the respective pixels 8a in the horizontal direction are displaced by the displacement amount of ⅓ of the pitch P between the pixels. Accordingly, considering one line, the output signals which are delayed by pitches of P/3 and 2P/3 through the delay circuits 55 and 56 are supplied to and added by the first adder circuit 57, from which there is generated a picked up image whose brightness is substantially three times as high as that of the single chip CCD. The video signal outputs also are added and then supplied to the video signal processor circuit 16.

Considering operation of the first, second and third CCDs 8A, 8B, 8C in the standard mode, the structures of the first, second and third CCDs 8A, 8B, 8C are the same so that the structure and operation thereof are similar to those of FIG. 3 and FIGS. 4A through 4D.

Similarly, the arrangement and operation of the first, second and third CCDs 8A, 8B, 8C in the slit mode are similar to those of FIG. 5 and FIGS. 6A through 6D. Accordingly, considering the added voltage in the adder circuit 57, because the first, second and third CCDs 8A, 8B, 8C are disposed such that the bonded position of the respective pixels are sequentially phase-shifted by one-third of the pitch P between the pixels in the horizontal direction, each line of the optical image output is phase-shifted by P/3. However, the phases of the image outputs are delayed by the delay circuits 55, 56 and matched and then added by the adder circuit 57. Therefore, as shown in FIGS. 17A through 17C, the video signals 30, of the first, second and third CCDs 8A, 8B and 8C are added and then the video signal 30 whose resolution is three times as high as the ordinary resolution is supplied to the video signal processor circuit 16. In other words, the CCD surface can be effectively utilized by filling the spacing between the pixels 8a with three columns of pixel lines.

While the three CCDs are disposed with the displacement of one-third of the pitch P between the pixels as described above, if two CCDs are disposed on a light emitting face of a prism, which diverges an object image into two directions, with a displacement of onehalf of the pitch P between the pixels, then a video signal having a resolution substantially twice as high as the conventional one can be obtained. Therefore, it is clear that, if n CCDs are disposed, then a video signal having a resolution n times as high as the conventional signal can be obtained.

Figure 18A:
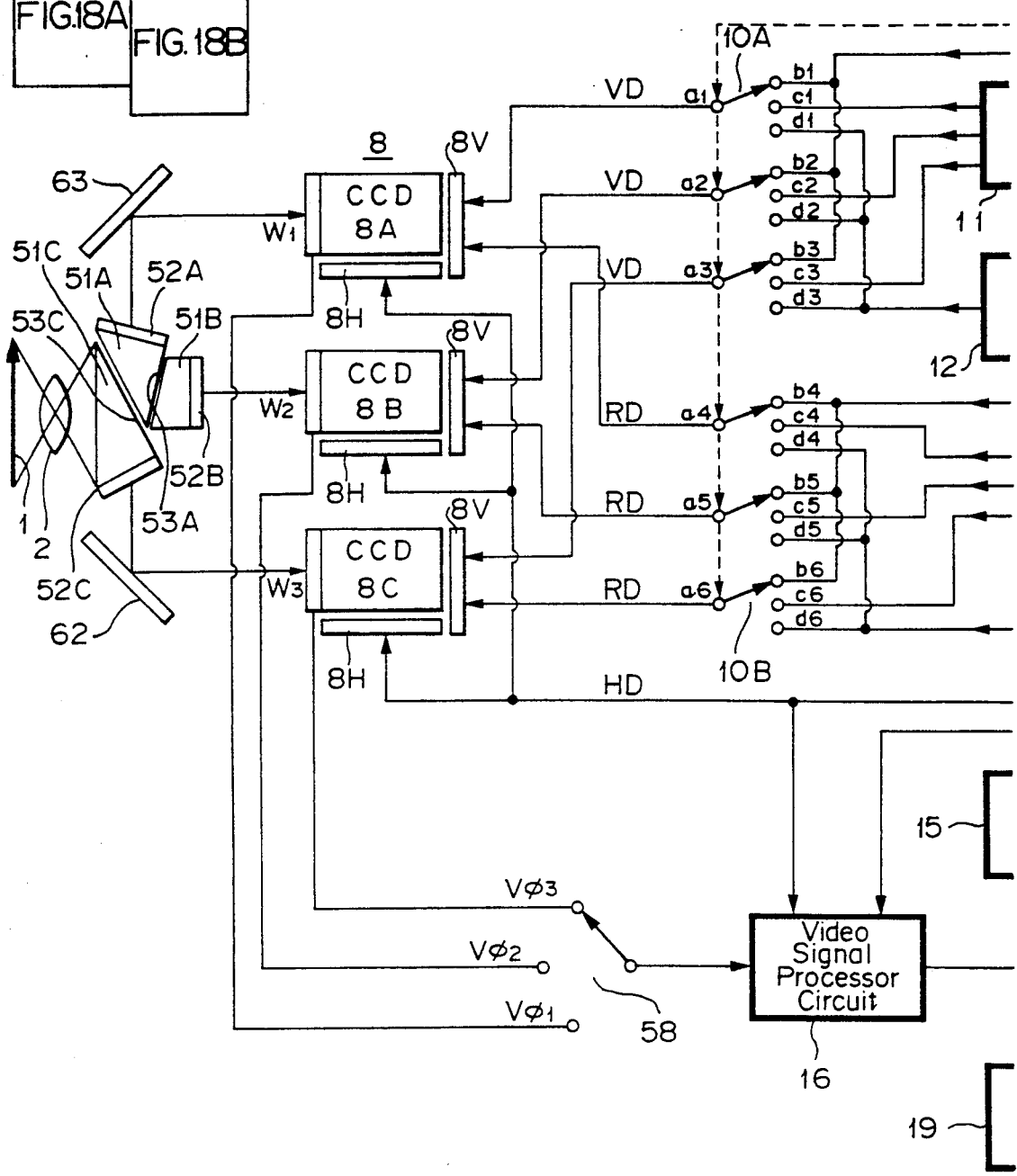
FIG. 18, which is formed of FIGS. 18A and 18B drawn on two sheets of drawings so as to permit the use of a suitably large scale, is a block diagram showing a camera apparatus according to a third embodiment of the present invention.
Figure 18B:
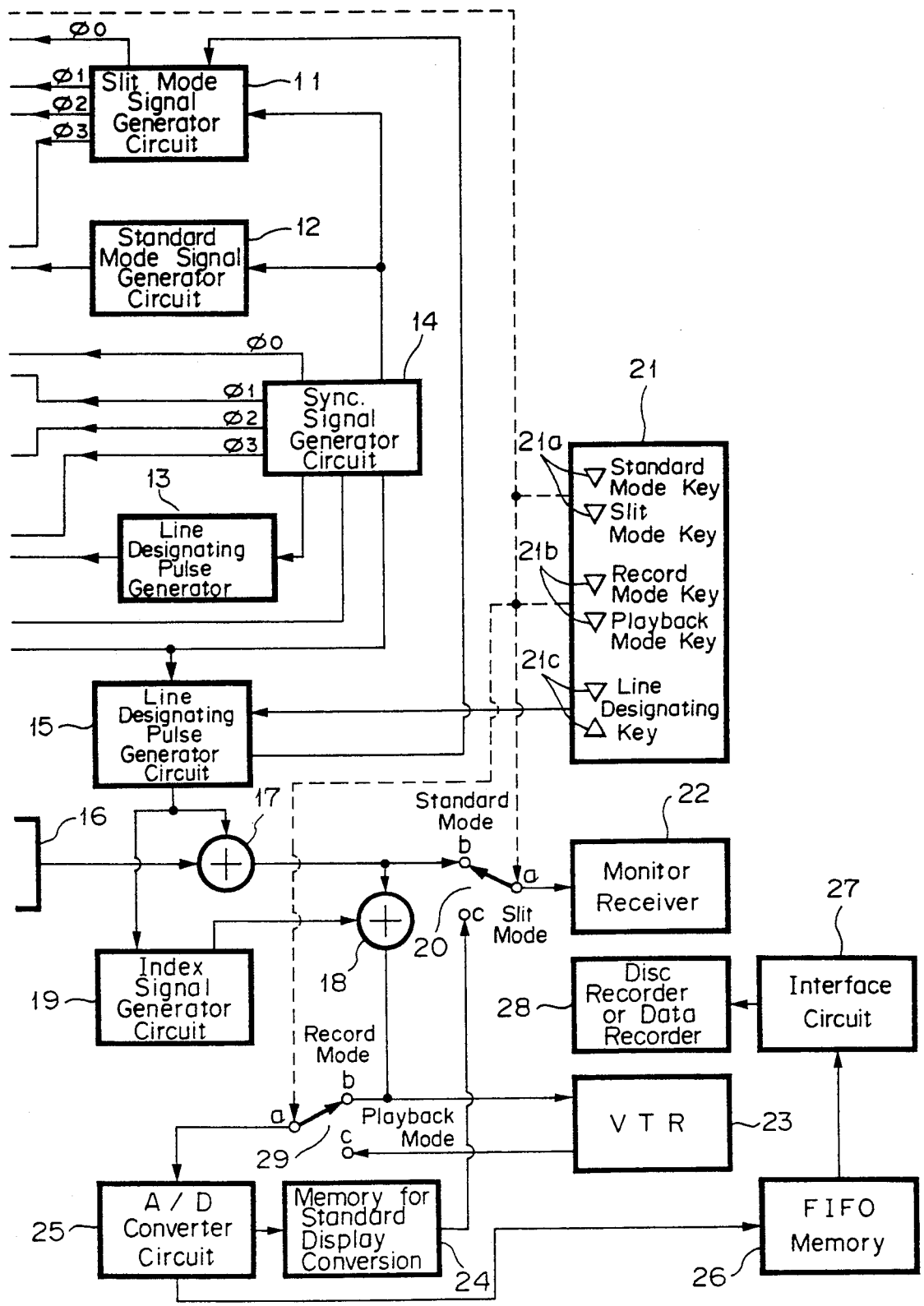

While the n CCDs are disposed with the displacement of 1/n pitch to simultaneously derive the video signals to thereby increase the resolution of the video signal as shown in FIG. 15, the present invention is not limited thereto and a variation is possible in which, if the slit camera of this invention is constructed as shown in FIG. 18, the resolution in the horizontal direction can be increased. FIG. 18 is formed of FIGS. 18A and 18B drawn on two sheets of drawings so as to permit the use of a suitably large scale. In the arrangement of FIG. 18, the optical system can be constructed in exactly the same way as that of FIG. 15 wherein like parts corresponding to those of FIG. 15 are marked with the same references. Therefore, in FIG. 18, only the structures different from those of FIG. 15 will be described below.

As shown in FIG. 18, object images incident on the groups of pixels $8a$ of the first, second and third CCDs 8A, 8B, 8C are converted into three sets of video signals in a parallel fashion and fed to a switching means 58, from which it is supplied to the video processor circuit 16 as a line-sequential video signal.

The slit mode signal generating circuit 11 derives an output signal $\phi_0$ for outputting the drive signal VD which drives the first, second and third CCDs 8A, 8B, 8C in series and timing signals $\phi_1$, $\phi_2$, $\phi_3$ for outputting the drive signal VD which drives the first second and third CCDs 8A, 8B, 8C at a timing difference of 1/n cycle.

Similarly, the sync. signal generator circuit 14 derives an output signal $\phi_0$ for outputting the read-out pulse RD which reads out the first, second and third CCDs 8A, 8B, 8C in series and timing signals $\phi_1$, $\phi_2$, $\phi_3$ for outputting the read-out pulse RD which reads out the first, second and third CCDs 8A, 8B, 8C at a timing difference of 1/n cycle. These signals $\phi_0$, $\phi_1$, $\phi_2$, $\phi_3$ are supplied through the switch 10B to the vertical transfer shift registers 8V of the first, second and third CCDs 8A, 8B and 8C. Also, the read-out pulse RD used when the standard mode signal is read out is supplied to the 1/n frequency-dividing circuit 13 and then fed through the switch 10B to the vertical transfer shift registers 8V of the first, second and third CCDs 8A, 8B and 8C.

More specifically, the output signal $\phi_0$ from the slit mode signal generator circuit 11 is commonly supplied to fixed contacts $b_1$, $b_2$, $b_3$ of the switch 10A of a three-series three-contact configuration. Similarly, the timing signals $\phi_1$, $\phi_2$, $\phi_3$ from the slit mode signal generator circuit 11 are respectively supplied to fixed contacts $c_1$, $c_2$, $c_3$ of the switch 10A and the output signal from the standard mode signal generator circuit 12 is commonly supplied to fixed contacts $d_1$, $d_2$, $d_3$ of the switch 10A.

Three movable contacts $a_1$, $a_2$, $a_3$ as of the switch 10A are respectively coupled to the vertical transfer shift registers 8V of the first, second and third CCDs 8A, 8B and 8C.

The output signal $\phi_0$ from the sync. signal generator circuit 14 is commonly supplied to fixed contacts $b_4$, $b_5$, $b_6$ of the switch 10B of a like three-series three-contact configuration. Similarly, the timing signals $\phi_1$, $\phi_2$, $\phi_3$ from the sync. signal generator circuit 14 are respectively supplied to fixed contacts $c_4$, $c_5$, $c_6$ of the switch 10B. Further, the output signal from the frequency-dividing circuit 13 is commonly supplied to fixed contacts $d_4$, $d_5$, $d_6$ of the switch 10B.

Three movable contacts $a_3$, $a_4$, $a_5$ of the switch 10B are respectively coupled to the vertical transfer shift registers 8V of the first, second and third CCDs 8A, 8B and 8C.

In the arrangement shown in FIG. 18, similarly as shown in FIG. 16, the first, second and third CCDs 8A, 8B, 8C are bonded to the light emitting faces 52A, 52B, 52C of the prisms 51A, 51B, 51C with the displacement of P/3 and the timing signals $\phi_0$ used to simultaneously drive and read out the drive signal and the read-out pulse are supplied from the slit mode signal generator circuit 11 and the sync. signal generator circuit 14 to the vertical transfer shift registers 8V of the first, second and third CCDs 8A, 8B and 8C.

Since the pixels $8_a$ in the horizontal direction of the first, second and third CCDs 8A, 8B and 8C are displaced by one-third of the pitch P between the pixels, the video signals $V_{\phi1}$, $V_{\phi2}$ and $V_{\phi3}$, each of which is shifted by P/3, are input to the switch 58 at every line. In this case, if the output of the switch 58 is supplied to the video processor circuit 16, then the video processor circuit 16 derives video signals $30_{\phi1}$, $30_{\phi2}$ and $30_{\phi3}$ which are sequentially phase-shifted by 1H each as shown in FIGS. 19A to 19C.

Further, if the first, second and third CCDs 8A, 8B and 8C are respectively bonded to the light emitting faces 52A, 52B and 52C of the prisms 51A, 51B and 51C without shifting the phase at the portion of the pixel $8a$, then the switches 10A and 10B are changed-over in such a fashion that the output signals from the slit mode signal generator circuit 11 and the sync. signal generator circuit 14 are driven and read-out by the reference timing signals $\phi_1$, $\phi_2$, $\phi_3$ which are phase-shifted by the predetermined phase-shift amount of 1/n each as shown in FIG. 18.

More specifically, the timing signals $\phi_1$, $\phi_2$ and $\phi_3$ from the slit mode signal generator circuit 11 and the sync. signal generator circuit 14 are output and fed to the fixed contacts $c_1$, $c_2$, $c_3$ and $c_4$, $c_5$, $c_6$ of the switches 10A and 10B and fed through the movable contacts $a_1$, $a_2$, $a_3$ and $a_4$, $a_5$, $a_6$ to the vertical transfer shift registers 8V of the first, second and third CCDs 8A, 8B, 8C as the drive signal VD and the read-out pulse RD, respectively. In this case, the switches 10A and 10B are switched to the slit mode by the operation unit 21. For example, the switches 10A and 10B are changed-over at the timings shown in FIGS. 20E, 20F and 20G.

Thus, the video signals $V_{\phi1}$, $V_{\phi2}$, $V_{\phi3}$ from the first, second and third CCDs 8A, 8B and 8C sequentially change-over the switch 58 at the timings shown in FIGS. 20E, 20F, 20G to thereby supply outputs, which are shifted by 2H each as shown in FIGS. 20B, 20C, 20D, to the video processor circuit 16. While the predetermined read-out cycle is selected to be 6H as shown in FIG. 20A and the output is read out at every 2H within one cycle, the present invention is not limited thereto and the output may be generated at every 1H pitch as shown in FIG. 19. In short, if the output from the first, second and third CCDs 8A, 8B, 8C are generated at an equal interval, then the video output in the time axis direction of the object 1, which constantly changes at high speed, can be read out during a short period of time.

That is, while the imager signal in the slit mode is read out at every 6H at high speed by the single CCD in the prior art with reference to FIG. 20, according to this embodiment, the video signal in the slit mode can be obtained at every 2H at high speed in the time axis direction within 6H. In addition, the video signal in the slit mode can be read out during the mode in which other CCDs are shifted at high speed.

While a imager apparatus 8 is described as the black and white camera apparatus, if the imager apparatus 8 is composed of three sets of CCDs of the monocolor type (one-chip color) in which R (red), G (green) and B (blue) filters are disposed on the front surfaces of the CCDs 8A, 8B and 8C, then color video signals are supplied to the input side of the video processor circuit 16 from the first, second and third one-chip color CCDs 8A, 8B, 8C. Thus, it is possible to obtain a camera apparatus in which the resolution in the time axis direction can be improved during a short period of time in the slit mode image pickup state, similarly to the black and white imager apparatus.

While the three CCDs are provided as described above, if two CCDs are separately provided in two directions, then it is possible to obtain a video signal whose resolution in the time axis direction is substantially twice as high as the conventional one.

The black and white camera apparatus has been mainly described so far in the foregoing embodiments. Referring to FIGS. 21 through 24, there will now be described a camera apparatus in which a three-chip type CCD is used as the image pickup device.

Figure 21A:
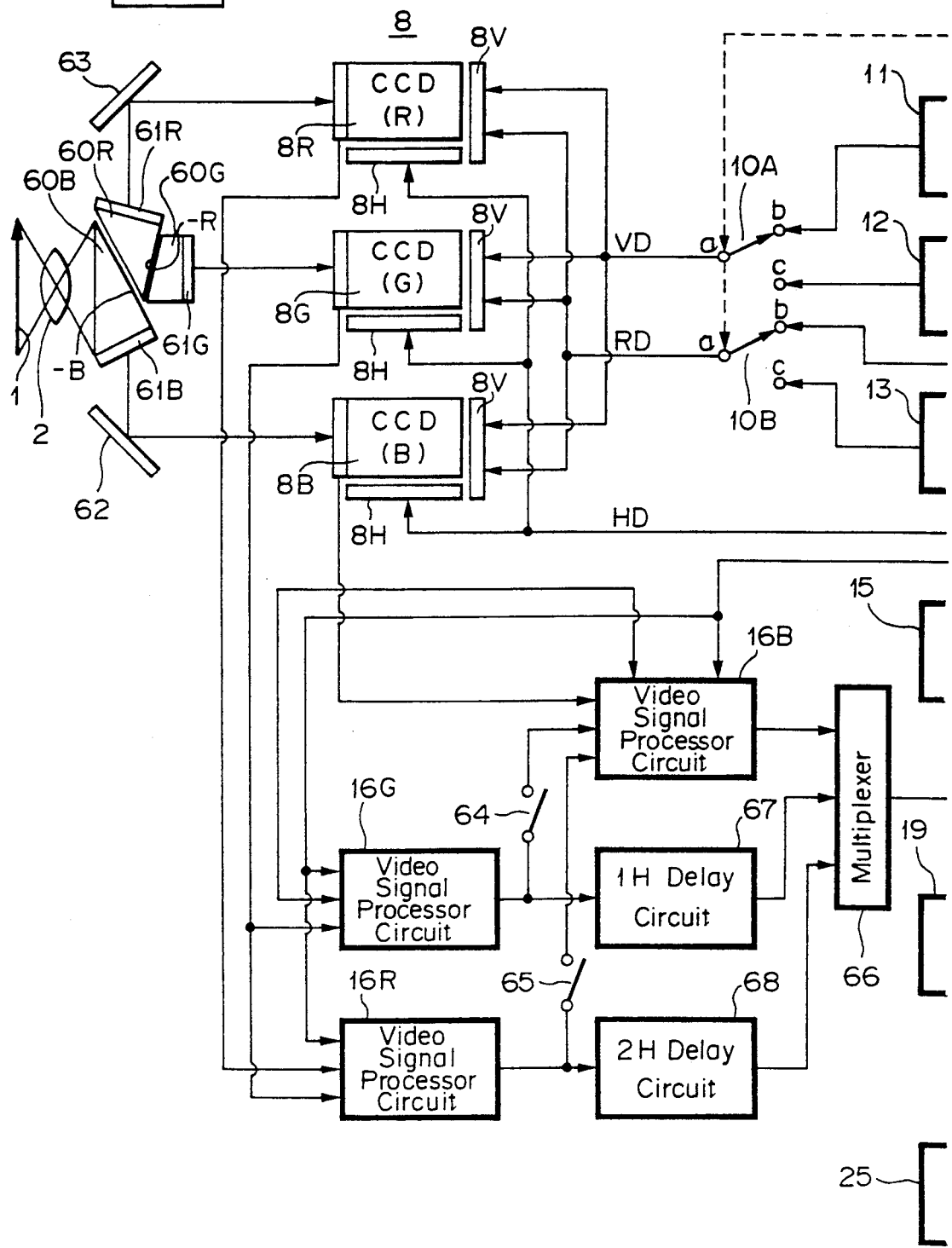
FIG. 21, which is formed of FIGS. 21A and 21B drawn on two sheets of drawings so as to permit the use of a suitably large scale, is a block diagram showing an arrangement in which the camera apparatus of the present invention is formed into a color camera apparatus according to a fourth embodiment of the present invention.
Figure 21B:
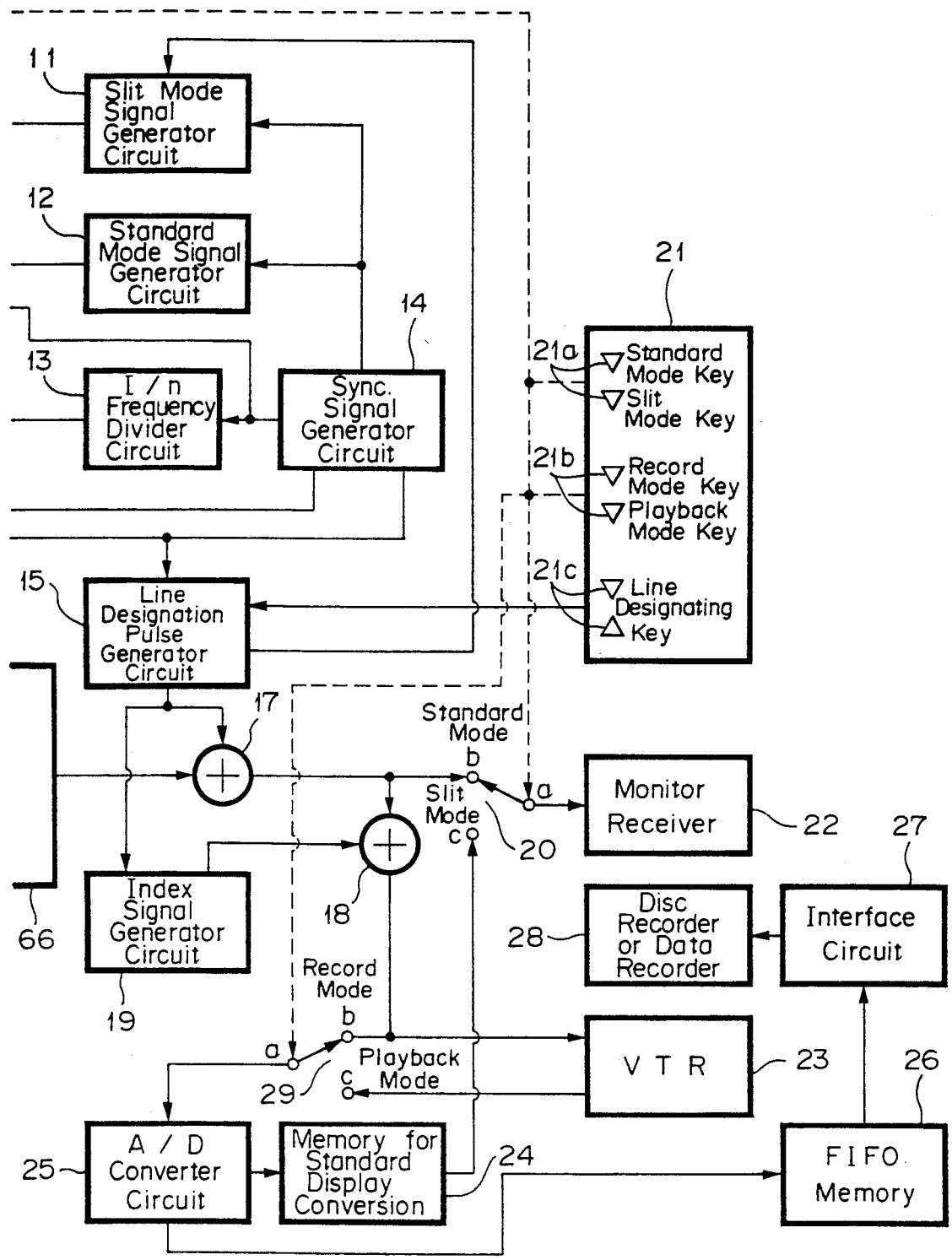

FIG. 21 is a block diagram showing the entire arrangement of the color camera apparatus according to the present invention. In this case, FIG. 21 is formed of FIGS. 21A and 21B drawn on two sheets of drawings so as to permit the use of a suitably large scale. Also, in FIG. 21, like parts corresponding to those of FIGS. 15 and 18 are marked with the same references and therefore need not be described in detail.

As shown in FIG. 21, the image pickup device 8 is formed of a three-chip CCD of the interline type, for example. The three-chip CCD 8 includes three CCDs for three primary color signals R, G, B and each of the CCDs 8R, 8G, 8B is composed of the pixel group forming the sensor portion, the vertical transfer register 8V and the horizontal transfer shift register 8H.

A synthesized prism composed of three prisms 60B, 60R, 60G and trimming filters 61B, 61R, 61G forming a three-primary color analyzing optical system is disposed in the front stage of these CCDs 8R, 8G and 8B.

Incident light R, G, B from the object 1 is introduced through the relay lens 2 into the prism 60B. In the prism 60B, a blue light B is reflected on its dichroic surface -B and red and green light R, G travel therethrough. The blue light B is corrected by the blue trimming filter 61B and then becomes incident on the photo-sensitive surface of the blue CCD 8B through a mirror 62.

The red and green light having traveled through the dichroic surface -B of the prism 60B, is supplied to the prism 60R, in which the red light R is reflected on a dichroic surface -R and the green light G is passed therethrough. The red light R reflected on the dichroic surface -R of the prism 60R is corrected by the trimming filter 61R and then introduced into the photo-sensitive surface of the red CCD 8R through a mirror 63.

Then, the green light G which traveled through the prism 60R is corrected by the green trimming filter 61G through the prism 60R and then becomes incident on the photo-sensitive surface of the green CCD 8G.

When the object 1 moving at high speed is picked up by the above-mentioned camera apparatus 8, object images incident on the pixel groups on the photo-sensitive surfaces of the three red, green and blue CCDs 8R, 8G, 8B are converted into red, green and blue video signals R, G, B and then fed to video signal processor circuits 16R, 16G and 16B.

Of the video signal processors 16R, 16G and 16B, the video signal processor 16B, for example, includes an NTSC conversion encoder, though not shown. When the video signal is output as the NTSC color video signal, the blue video signal B from the CCD 8B and the red and green video signals R, G from the CCDs 8R, 8G are processed by the video signal processor circuits 16G and 16R and supplied through switches 64, 65 to the video signal processor circuit 16B. Then, these signals are supplied through a multiplexer circuit 66, which will be described later, the first adder circuit 17 and the switch 20 to the display device such as the CRT, the LCD or the like within the monitor receiver, so that the imager signal is displayed.

According to this embodiment, in the slit camera image pickup mode, the red, green and blue video signals R, G and B from the CCDs 8R, 8G, 8B of the three-chip type are respectively supplied to the video signal processor circuits 16R, 16G, 16B. Unnecessary data generated by high speed processing is cancelled and processed by these video signal processor circuits. An output of the video signal processor circuit 16B is directly supplied to the multiplexer circuit 66 and an output of the video signal processor circuit 16G is supplied through a 1H (one horizontal period) delay circuit 67 to the multiplexer circuit 66. Also, an output of the video signal processor circuit 16R is supplied through a 2H delay circuit 68 to the multiplexer circuit 66. Thus, in the multiplexer circuit 66, these output signals are time division multiplexed and then output as video signals 30R, 30G, 30B in a line-sequential manner as shown in FIG. 22A.

An output of the multiplexer circuit 66 is supplied to the adder circuit 17, in which a line designating pulse from the line designating pulse generating circuit 15 is added to the red, green and blue video signals 30R, 30G, 30B thus converted in a line-sequential manner. Also, the line designating pulse is supplied to the index generating circuit 19.

An output of the adder circuit 17 is supplied through the fixed contact b and the movable contact a of the switch 20, which switches between the standard mode in which a picture is taken according to the ordinary television system and the above-mentioned slit mode, to the monitor receiver 22, so that an image is displayed.

The output of the adder circuit 17 is also supplied to the second adder circuit 18. The index signal from the index generating circuit 19 is supplied to the second adder circuit 18, in which index signals 33 shown in FIGS. 22A and 22B are added onto the red, green and blue video signals 30R, 30G and 30B, whereby the index signals are provided to the video tape recorder 23 and other recording apparatus 28 such as the disc recorder, the data recorder or the like, wherein the red, green and blue video signal thus converted in a line-sequential fashion are recorded.

The drive signal HD and the like are supplied to the horizontal transfer shift registers 8H, . . . of the CCDs 8R, 8G, 8B and the video signal processor circuits 16B, 16G, 16R from the sync. signal generator circuit 14.

The operation unit 21 includes control means such a computer or the like, though not shown. Then, on the basis of the instruction signal from the operation unit 21, the slit mode or the standard mode key is selected to allow the drive signal VD and the read-out pulse RD to be supplied through the switches 10A, 10B to the vertical transfer shift registers 8V, ... of the CCDs 8R, 8G, 8B, respectively.

More specifically, various vertical reference signals from the sync. signal generator circuit 14 are respectively supplied to the standard mode signal generator circuit 12, the slit mode signal generator circuit 11, the video signal processor circuits 16B, 16G and 16R, the fixed contact b of the switch 10B, the 1/n frequency-dividing circuit 13 and the line designating pulse forming circuit 15.

The line-designating pulse signal from the line designating pulse generator circuit 15 is supplied to the slit mode signal generator circuit 11, and the line-designating pulse signal is also supplied to the adder circuit 17 and the index generator circuit 19 as described before.

The output ends of the slit mode signal generator circuit 11 and the standard mode signal generator circuit 12 are coupled to the fixed contacts b and c of the switch 10A and the movable contact a of the switch 10A is coupled to the respective vertical transfer shift registers 8V, ... of the CCDs 8R, 8G, 8B to thereby supply the drive signal VD to the vertical transfer shift registers 8V. Further, the output end of the 1/n frequency-dividing circuit 13 is coupled to the fixed contact c of the switch 10B and the fixed contacts c, b of the switch 10B are selectively coupled to the movable contact a to thereby supply the drive signal to the vertical transfer shift register 8V.

The operation unit 21 includes the operation key 21a for switching the CCDs 8R, 8G, 8B to the standard mode or the slit mode, the record and/or playback keys 21b for enabling the signals of the respective modes to be recorded in and/or reproduced from the video tape recorder 23 or other recording apparatus 28 such as the disc recorder or the data recorder and the line designating keys 21c for designating the line position of the slit mode and the number of lines. Operation of these keys 21a, 21b and 21c actuates the slit mode and standard mode change-over switches 10A, 10B, the switch 20 for switching the slit mode and the standard mode to be monitored and the switch 29 for switching the recording and reproducing states of the video tape recorder 23 as shown by dashed lines in FIG. 21. Also, the line designating pulse generator circuit 15 is driven by operating the line designating key 21c.

In the second adder circuit 18, the index signal from the index generator circuit 19 is added to the predetermined position whose line is designated. Then, the added signal from the second adder circuit 18 is supplied through the video tape recorder 23 and the fixed contact b and the movable contact a of the recording and/or reproducing change-over switch 29 to the A/D converter circuit 25, in which it is converted into a digital signal. Data resulting from conversion into the digital signal is supplied to the standard display conversion memory 24 and the FIFO memory 26, and an output from the FIFO memory 26 is supplied through the interface circuit 27 and then recorded by the recording apparatus 28 such as the disc recorder or the data recorder which is different from the video tape recorder 23.

The video signal in the slit mode stored in the standard display conversion memory 24 is read out therefrom as the standard mode video signal and fed through the fixed contact c of the switch 20 to the monitor receiver 22, whereby it is displayed on the display means.

Since the CCDs 8R, 8G and 8B are the same in structure, let us consider only the CCD 8R of the interline type. In this case, operation of the slit mode signal generator circuit 11 and the standard mode signal generator circuit 12 thus arranged are exactly the same as the standard mode operation described earlier with reference to FIG. 3 and FIGS. 4A through 4D and the slit mode operation described earlier with reference to FIG. 5 and FIGS. 6A through 6D and therefore need not be described in detail. Further, in FIG. 21, like parts corresponding to those of FIGS. 2, 15 and 18 are marked with the same references and therefore need not described in detail. According to this embodiment, a line-sequential color video signal can be obtained with ease.

The line-designating pulse supplied to the first adder circuit 17 from the line designating pulse generator circuit 15 is superimposed upon the red, green and blue video signals 30B, 30G and 30B from the CCDs 8R, 8G and 8B. At that time, since the switch 20 is set in the standard mode, the movable contact a is corrected to the fixed contact b, the color line marker 32 shown in FIG. 7 is superimposed upon the display means of the monitor receiver 22 so that the position of the slit line can be designated with ease.

Further, the line-designating pulse from the line designating pulse generating circuit 15 is supplied to the index generator circuit 19. The index generator circuit 19 may be formed of a write buffer memory, a frame memory or the like. The index signal 33 supplied to the second adder circuit 18 is superimposed upon the red, green and blue video signals 30R, 30G and 30B as shown in FIGS. 22A and 22B.

Since the index signal is superimposed upon the line-sequential red, green and blue video signals 30R, 30G and 30B as shown in FIG. 22A, a starting portion of the video signal in the slit mode recorded on the video tape recorder 23 can be detected with ease when the video signal is reproduced.

Further, as shown in FIG. 22B, the video signal portion, which is shifted at high speed, may be removed at every 1H and replaced with another predetermined signal such as a time signal 70 or the like.

An arrangement in which the line sequential red, green and blue color video signal produced in the slit mode and recorded on the video tape recorder 23 or other recording apparatus 28 as shown in FIG. 21 is displayed with high resolution will be described with reference to FIG. 23.

Figure 23:
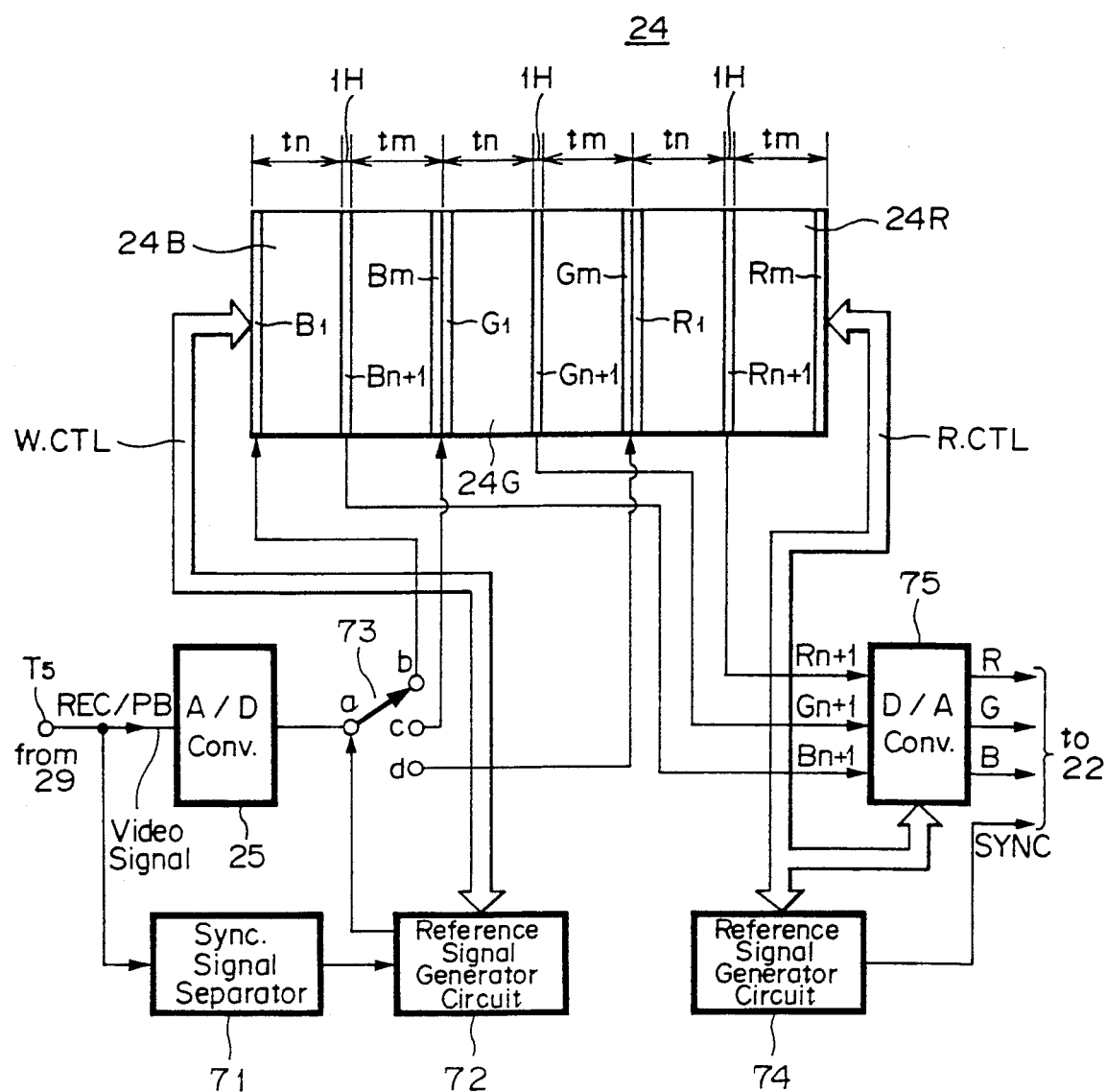
FIG. 23 is a schematic diagram showing a display conversion memory used in the camera apparatus according to the present invention.

FIG. 23 of the accompanying drawings shows a schematic diagram used to explain an the internal structure of the standard display conversion memory 24.

Referring to FIG. 23, the signal recorded on or reproduced from the video tape recorder 21 shown in FIG. 21 is applied from the switch 29 to an input terminal $T_5$. This signal is supplied to the A/D converter circuit 25 and also supplied to a sync. separator circuit 71, in which the analog signal is converted into a digital signal and a sync. signal is separated from the video signal.

On the basis of the sync. signal from the sync. signal separator circuit 71, a reference signal generator circuit 72 forms a predetermined timing signal and supplies a write clock signal, an address pulse or the like to the memory 24. Also, a switch 73 is controlled by the reference signal generator circuit 72. The memory 24 includes storage areas 24B, 24G, 24R corresponding to the CCDs 8R, 8G and 8B.

The movable contact a of the switch 73 is controlled by a control signal from the reference signal generator circuit 72 and the fixed contacts b, c and d thereof are respectively connected in such a fashion that the writing of the line-sequential video signal is started from the first address of each of the memory areas 24B, 24G and 24R.

A reference signal generator circuit 74 for reading out the memory operates to supply a read-out clock to a digital-to-analog (D/A) converter circuit 75 and the memory 24 to control the memory 24 so that memory data in the memory areas 24B, 24G, 24R of the memory 24 are read out simultaneously. Read-out R, G, B video data in the slit mode, for example (data $B_{n+1}$, $G_{n+1}$·$R_{n+1}$ which are provided when signal charges are shifted at high speed during the tn and tm periods and shifted at low speed during the 1H period) are converted into analog data by the D/A converter circuit 75 as an NTSC television signal, for example, thereby being displayed in color on the display means of the monitor receiver 22.

Figure 24:
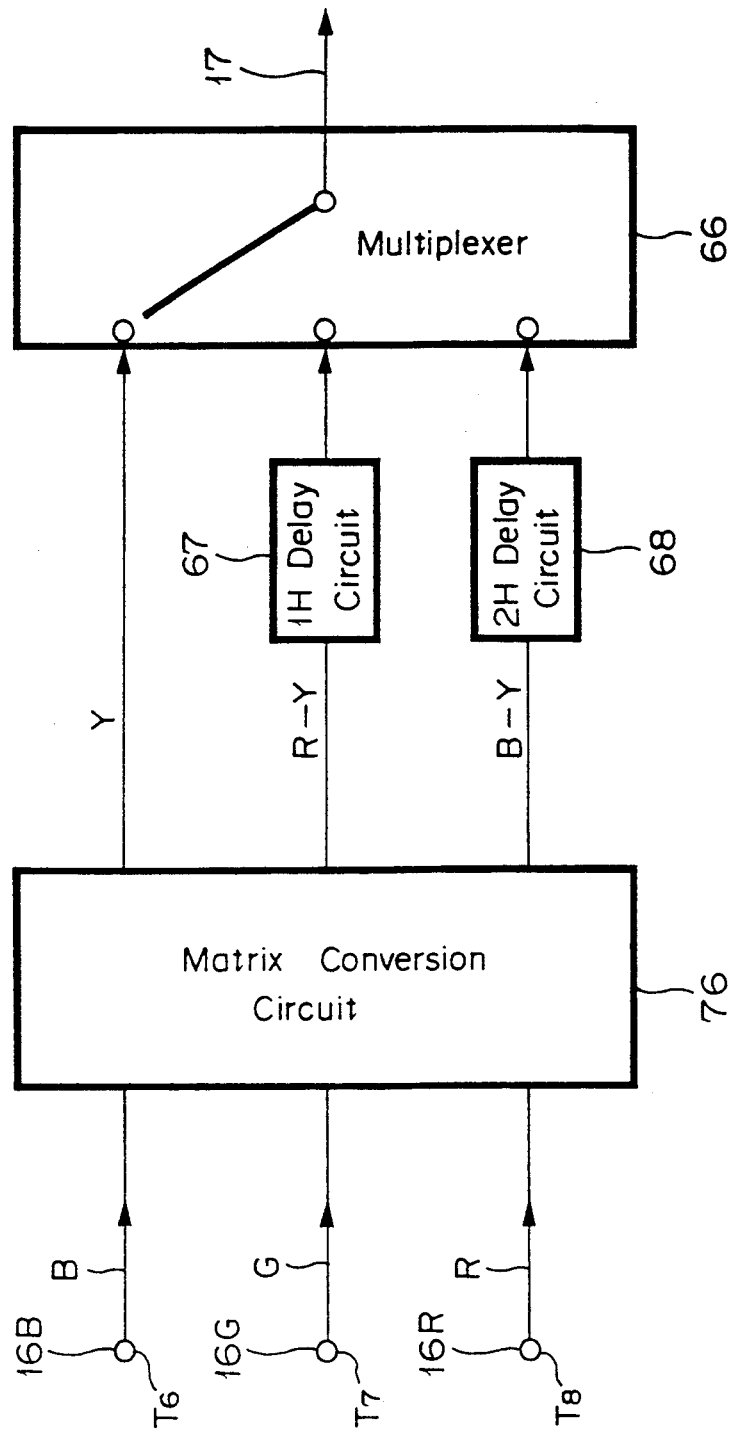
FIG. 24 is a block diagram showing an other example of the application of the camera apparatus according to the present invention, and to which references will be made in explaining a line sequential recording method.

While the three primary color video signals R, G and B are recorded on the video tape recorder 23 as described above, the following variant shown in FIG. 24 also is possible:

As shown in FIG. 24, video signal outputs B, G, R from the video processor circuits 16B, 16G and 16R are supplied to input terminals $T_6$, $T_7$ and $T_8$. These video signals are supplied to a matrix conversion circuit 76, in which they are converted into a luminance signal Y and red and blue color difference signals R-Y and B-Y. Then, these color difference signals R-Y and B-Y are supplied through 1H and 2H delay circuits 67 and 68 to a multiplexer 66, in which they are converted into a line-sequential video signal and then recorded on the video tape recorder 23.

According to the color camera apparatus of the present invention, since signal charges are shifted at low speed during 1H to several Hs of the area sensor such as the three-chip color CCDs or the like and shifted at high speed during other lines and then recorded on the video tape recorder in a line sequential fashion, an entirely electronic slit camera which is compatible with a standard camera can be obtained by electronically modifying the area sensor, and also a color slit camera having a high resolution can be obtained.

According to the present invention, it is possible to obtain a camera apparatus which can achieve the following effects:

(1) An entirely electronic camera apparatus can be obtained in which a standard CCD camera can be used as a slit camera. Also, the slit camera can be constructed without a mechanical slit plate and a polygon mirror.

(2) The position of the slit when the camera apparatus of the present invention is to be used as a slit camera can easily be displayed on the picture screen of the display means as a marker and the slit position also can be designated with ease.

(3) In the playback mode when the camera apparatus of the present invention is utilized as a slit camera, a starting portion of the effective slit line can be detected with ease using an index signal.

(4) When the camera apparatus of the present invention is utilized as a slit camera, resolution can be improved by disposing a line adder circuit in the video signal system.

(5) According to the camera apparatus of the present invention, by changing the electronic system alone, it is possible to obtain a slit camera compatible with an ordinary camera which can be driven according to the standard television system.

(6) Since a plurality of CCDs are disposed with a displacement of 1/n of the pitch between the pixels and utilized as a slit camera, it is possible to obtain a black and white camera apparatus which can pick up an image with high resolution.

(7) Since a plurality of CCDs are employed, it is possible to obtain a color camera apparatus which can be used as both a slit camera and an ordinary color camera.

(8) Since a plurality of CCDs are disposed with a displacement of 1/n of the pitch between the pixels or the video signals from plural CCDs are read out at timings shifted by 1/n cycle, it is possible to obtain a slit camera in which resolution in the time axis direction can be improved.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A camera for generating an image of an object moving at high speed, comprising:
    a two-dimensional array of image elements for forming lines of image charge signals;
    a plurality of liens of charge storage registers extending in a line direction and arrayed in association with said array of image elements for storing said image charge signals formed by said array of image elements and for shifting said stored image charge signals line-by-line in a column direction that is perpendicular to said line direction;
    a line output register that is adjacent in said column direction to said lines of charge storage registers for receiving said shifted image charge signals line-by-line and for shifting a received line of said image charge signals element-by-element to an output terminal;
    means for selecting at least one line of wanted image charge signals from among said image charge signals stored in said lines of charge storage registers; and
    means for driving said lines of charge storage registers so that said image charge signals stored therein are shifted toward said line output register at a first rate at a time when said at least one line of wanted image charge signals is being shifted into said line output register and so that said image charge signals stored in said charge storage registers are shifted toward said line output register at a second rate that is substantially faster than said first rate at times when lines of said image charge signals other than said at least one line are being shifted into said line output register.

2. A camera according to claim 1, further comprising: means for selectively switching said camera between:
    a slit mode, in which said image charge signals stored in said liens of charge storage registers are shifted toward said line output register at said first rate at said time when said at least one line is being shifted into said line output register and said image charge signals stored in said charge storage registers are shifted toward said line output register at said second rate at said times when said other lines are being shifted into said line output register, and a standard mode in which said image charge signals stored in said lines of charge storage registers are shifted toward said line output register at a constant rate during a period in which substantially all of said image charge signals are shifted line-by-line into said line output register; and means for displaying a standard mode image in accordance with said image charge signals as the same are shifted out from said line output register in said standard mode and for displaying a marker superimposed on said standard mode image, said marker corresponding to said at least one line of wanted image charge signals selected by said means for selecting.

3. A camera according to claim 2, wherein said period in which substantially all of said image charge signals are shifted line-by-line into said line output register in said standard mode is substantially equal to a field period of a standard television signal.

4. A camera according to claim 3, wherein said first rate at which said image charge signals are shifted toward said line output register in said slit mode is substantially the same as said constant rate at which said charge storage signals are shifted toward said line output register in said standard mode.

5. A camera according to claim 1, further comprising:

means for generating an index signal for indicating a position of said at least one line of wanted image charge signals within a video signal that has been outputted form said output terminal;

means for superimposing said index signal upon said video signal that has been outputted from said output terminal; and means for recording said video signal after said index signal has been superimposed thereon by said superimposing means.

6. A camera according to claim 1, wherein said at least one line of wanted image charge signals comprises plural lines of wanted image charge signals and further comprising means for adding said plural lines of wanted image charge signals after the same have been outputted from said output terminal.

7. A camera according to claim 1, further comprising means for reading out from said output terminal substantially all of said image charge signals stored in said liens of charge storage registers during a period that is substantially equal to K standard line scan periods, where K is a product of two irreducible factors of a number of scanning lines making up a frame of a standard television signal.

8. A camera according to claim 7, wherein said standard television signal includes a vertical blanking period including a vertical synchronizing pulse and equalizing pulses, and said vertical synchronizing pulse and equalizing pulses take up a number of scanning lines that is less than K.

9. A camera according to claim 7, wherein K is a lowest one of a group of products formed by multiplying pairs of irreducible factors of said number of scanning lines making up a frame of said standard television signal.

10. A camera according to claim 9, wherein said number of scanning lines making up a frame of said standard television signal is 525 and K is 15.

* * * * *